(12) United States Patent
Huang et al.

(10) Patent No.: US 10,165,399 B2
(45) Date of Patent: Dec. 25, 2018

(54) LOCATION MONITORING FEATURE OF A MOBILE DEVICE FOR ACTIVATING AN APPLICATION SUBSYSTEM

(71) Applicant: Apple Inc., Cupertino, CA (US)

(72) Inventors: Ronald K. Huang, San Jose, CA (US); Morgan Grainger, Sunnyvale, CA (US); Robert W. Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/456,408

(22) Filed: Mar. 10, 2017

(65) Prior Publication Data

US 2017/0188307 A1    Jun. 29, 2017

Related U.S. Application Data

(63) Continuation of application No. 14/798,305, filed on Jul. 13, 2015, now Pat. No. 9,596,565, which is a (Continued)

(51) Int. Cl.
*H04W 4/021* (2018.01)
*G01S 5/02* (2010.01)
(Continued)

(52) U.S. Cl.
CPC ........... *H04W 4/021* (2013.01); *G01S 5/0252* (2013.01); *H04M 1/72572* (2013.01);
(Continued)

(58) Field of Classification Search
CPC ............ H04W 4/021; H04W 52/0229; H04W 52/0251; G01S 5/0252; H04M 1/72572
See application file for complete search history.

(56) References Cited

U.S. PATENT DOCUMENTS

| 5,945,944 A | 8/1999 | Krasner |
|---|---|---|
| 6,445,937 B1 | 9/2002 | daSilva |

(Continued)

FOREIGN PATENT DOCUMENTS

| CN | 1653726 A | 8/2005 |
|---|---|---|
| CN | 1662878 A | 8/2005 |

(Continued)

OTHER PUBLICATIONS

Chinese Patent Application No. 201280027292.7—Notification of First Office Action dated Aug. 20, 2014.
(Continued)

*Primary Examiner* — Christopher M Brandt
(74) *Attorney, Agent, or Firm* — Dickinson Wright RLLP

(57) ABSTRACT

Methods, program products, and systems for baseband location monitoring and related functions are disclosed. A mobile device can monitor its own current location using its baseband subsystem and decide whether to selectively activate its application subsystem based on whether particular conditions are satisfied by the current location. The mobile device can also correlate location and cellular signal information using its baseband subsystem and provide the correlated location and cellular signal information to a server. The server can receive the correlated location and cellular signal information from the baseband subsystems of a large number of widely distributed mobile devices and generate respective profiles of cellular network base stations that transmitted the cellular signals to the mobile devices. The profiles of the cellular network base stations can be used by the server in fulfilling subsequent positioning requests from mobile devices that do not currently have the baseband location monitoring enabled.

8 Claims, 9 Drawing Sheets

Related U.S. Application Data continuation of application No. 13/153,332, filed on Jun. 3, 2011, now Pat. No. 9,118,776.

(51) Int. Cl.
    *H04M 1/725*     (2006.01)
    *H04W 52/02*     (2009.01)
    *H04W 4/02*     (2018.01)
    *H04W 4/50*     (2018.01)

(52) U.S. Cl.
    CPC ......... *H04W 4/02* (2013.01); *H04W 52/0229* (2013.01); *H04W 52/0251* (2013.01); *H04W 4/50* (2018.02); *Y02D 70/00* (2018.01); *Y02D 70/1224* (2018.01); *Y02D 70/142* (2018.01); *Y02D 70/144* (2018.01); *Y02D 70/146* (2018.01); *Y02D 70/164* (2018.01); *Y02D 70/23* (2018.01)

(56) References Cited

U.S. PATENT DOCUMENTS

| | | | |
|---|---|---|---|
| 7,069,018 B1* | 6/2006 | Granstam | H04M 1/663 455/414.1 |
| 7,127,257 B2 | 10/2006 | Riley et al. | |
| 7,346,787 B2 | 3/2008 | Vaidya et al. | |
| 7,523,326 B2 | 4/2009 | Miyazaki et al. | |
| 7,528,772 B2 | 5/2009 | Ruutu et al. | |
| 7,962,775 B1 | 6/2011 | Vaidyu et al. | |
| 8,065,508 B2 | 11/2011 | Rubin et al. | |
| 8,099,124 B2 | 1/2012 | Tilley | |
| 8,161,299 B2* | 4/2012 | Karkaria | G06F 9/445 713/300 |
| 8,265,658 B2* | 9/2012 | Issa | H04W 4/029 455/456.3 |
| 8,315,646 B2* | 11/2012 | Karjalainen | H04W 4/02 455/456.1 |
| 8,463,333 B2 | 6/2013 | Stuivenwold | |
| 8,504,061 B2 | 8/2013 | Grainger et al. | |
| 8,504,121 B1 | 8/2013 | Pan | |
| 8,558,693 B2* | 10/2013 | Martin | G06Q 10/109 340/457 |
| 9,118,776 B2 | 8/2015 | Huang et al. | |
| 9,596,565 B2 | 3/2017 | Huang et al. | |
| 2002/0068583 A1* | 6/2002 | Murray | H04M 3/432 455/456.3 |
| 2002/0107031 A1* | 8/2002 | Syrjarinne | G01S 19/03 455/456.1 |
| 2002/0132625 A1* | 9/2002 | Ogino | G01S 1/022 455/456.2 |
| 2002/0168988 A1 | 11/2002 | Younis | |
| 2004/0072566 A1* | 4/2004 | Kuwahara | H04W 64/00 455/440 |
| 2004/0166881 A1* | 8/2004 | Farchmin | G01S 5/0252 455/457 |
| 2004/0176107 A1 | 9/2004 | Chadha | |
| 2004/0187039 A1 | 9/2004 | Yang | |
| 2005/0144318 A1 | 6/2005 | Chang | |
| 2005/0219120 A1 | 10/2005 | Chang | |
| 2006/0009235 A1 | 1/2006 | Sheynblat et al. | |
| 2006/0022802 A1 | 2/2006 | Bridgelall | |
| 2006/0068855 A1 | 3/2006 | Miyazaki et al. | |
| 2006/0095348 A1* | 5/2006 | Jones | G01S 5/02 705/29 |
| 2007/0061448 A1 | 3/2007 | Takahashi et al. | |
| 2008/0008117 A1* | 1/2008 | Alizadeh-Shabdiz | G01S 5/02 370/328 |
| 2008/0022287 A1* | 1/2008 | Bril | G06Q 10/06 718/107 |
| 2008/0147321 A1* | 6/2008 | Howard | G01C 21/367 701/431 |
| 2008/0168267 A1 | 7/2008 | Bolen et al. | |
| 2009/0132197 A1 | 5/2009 | Rubin et al. | |
| 2009/0161662 A1 | 6/2009 | Wu | |
| 2009/0309789 A1* | 12/2009 | Verechtchiagine | G01S 19/42 342/357.33 |
| 2009/0316671 A1 | 12/2009 | Rolf et al. | |
| 2010/0010738 A1 | 1/2010 | Cho | |
| 2010/0103048 A1* | 4/2010 | Bamberger | G01S 5/0252 342/451 |
| 2010/0162294 A1 | 6/2010 | Yin et al. | |
| 2010/0260388 A1* | 10/2010 | Garrett | G06Q 20/22 382/124 |
| 2010/0309051 A1 | 12/2010 | Moshfeghi | |
| 2011/0018346 A1 | 1/2011 | Dixon | |
| 2011/0019600 A1 | 1/2011 | Ping et al. | |
| 2011/0055434 A1 | 3/2011 | Pyers et al. | |
| 2011/0057836 A1 | 3/2011 | Ische et al. | |
| 2011/0252378 A1 | 10/2011 | Anzures et al. | |
| 2011/0269425 A1* | 11/2011 | Drovdahl | H04L 29/12122 455/411 |
| 2012/0058826 A1* | 3/2012 | Amaitis | G07F 17/3218 463/42 |
| 2012/0264447 A1* | 10/2012 | Rieger, III | G01S 5/0252 455/456.1 |
| 2012/0329420 A1 | 12/2012 | Zotti et al. | |
| 2014/0324332 A1 | 10/2014 | Cho | |

FOREIGN PATENT DOCUMENTS

| | | |
|---|---|---|
| EP | 2073098 A2 | 6/2009 |
| KR | 1020060091165 A | 8/2006 |
| KR | 1020100007221 A | 1/2010 |
| KR | 1020100052324 A | 5/2010 |
| WO | 03079578 A1 | 9/2003 |
| WO | 2004003703 A2 | 1/2004 |

OTHER PUBLICATIONS

Korean Patent Application No. 10-2014-7000059—Office Action dated May 15, 2015.
Chinese Patent Application No. 201280027292.7—Notification of the Second Office Action dated Mar. 6, 2015.
Chinese Patent Application No. 201280027292.7—Notification of the Third Office Action dated Sep. 17, 2015.
European Patent Application No. 12725191.6—Communication pursuant to Article 94(3) EPC dated Apr. 22, 2016.
PCT Patent Application No. PCT/US2012/038190—International Search Report and Written Opinion dated Nov. 15, 2012.

\* cited by examiner

LOCATION MONITORING FEATURE OF A MOBILE DEVICE FOR ACTIVATING AN APPLICATION SUBSYSTEM

CROSS-REFERENCE TO RELATED APPLICATIONS

This application is a continuation of U.S. application Ser. No. 14/798,305, filed Jul. 13, 2015, of the same title, set to issue as U.S. Pat. No. 9,596,565 on Mar. 14, 2017, which is a continuation of U.S. application Ser. No. 13/153,332, filed Jun. 3, 2011, now U.S. Pat. No. 9,118,776, Issued Aug. 25, 2015, entitled "LOCATION MONITORING FEATURE OF A MOBILE DEVICE FOR ACTIVATING AN APPLICATION SUBSYSTEM", the contents of which are incorporated herein by reference in their entirety for all purposes.

FIELD

This disclosure relates generally to location-based processing for a mobile device.

BACKGROUND

A modern mobile device can incorporate functions of multiple conventional electronic devices, including a personal computer, a cellular phone, a radio transceiver, and/or a wireless (e.g., WiFi or GPS) transceiver. For example, a modern mobile phone or personal data assistant (PDA) can provide telephony services, as well as hosting user applications for organizing contacts, playing music, providing email communications, browsing the Internet, and so on. In some mobile devices, a positioning system integrated with, or coupled to, the mobile device also provides opportunities for applications to provide location-based services (e.g., map services, location-based search refinements).

A mobile device that provides both telephony services and application services typically includes a baseband subsystem and an application subsystem. The baseband subsystem includes one or more baseband processors and supports a baseband operating system that operates in a constant active mode. The baseband subsystem can generate real-time responses to external events, and is often reserved for the telephony functions of the mobile device. The application subsystem includes one or more application processors and an application operating system. User applications are typically installed and executed within the application subsystem of the mobile device. The application subsystem can switch between an active mode and a dormant mode. In general, the application subsystem consumes more power than the baseband subsystem when in its active mode. Switching the application subsystem into the dormant mode after an extended idle period can help conserve battery power of the mobile device.

SUMMARY

Methods, program products, and systems for monitoring a current location (e.g., a current Global Positioning System (GPS) location fix) of a mobile device utilizing a baseband subsystem of the mobile device are disclosed. The baseband location monitoring in conjunction with particular location-related decision logic implemented in the baseband subsystem, can be used to activate the application subsystem of the mobile device on an "as needed" basis, such that better power management and efficiency of the mobile device can be achieved.

In addition, a mobile device can use its baseband subsystem to correlate parameter values characterizing cellular signals received from transmitters of one or more cellular network base stations with respective locations at which the signals were received, and provide the correlated location and cellular signal information to a server, without incurring significant power consumption or involvement of the application subsystem. The server can "crowd source" such correlated location and cellular signal information from many mobile devices to generate profiles for multiple base stations of one or more cellular networks, and to maintain a base station almanac. The server can also use the information in the base station almanac to provide cell-based positioning services, for example, to a mobile device that does not have a GPS system currently enabled.

In addition, the mobile device can request and obtain profile information of base stations from the server from time to time independent of a specific positioning request, where each time, a bundle of profile information for multiple base stations (e.g., all base stations distributed in a geographic region associated with a user) can be downloaded from the server. The mobile device can store such information for an effective time period (e.g., one day) associated with the profile information bundle. During the effective time period of the profile information bundle, the mobile device can change locations and perform cellular-based or cellular-assisted self-positioning based on the cellular signals it currently receives and the preloaded base station profiles, without contacting the server repeatedly to obtain new base station profile information.

In general, in one aspect, a method includes: monitoring a current location of a mobile device using a baseband subsystem of the mobile device; verifying, using the baseband subsystem, that one or more conditions are satisfied based on the current location of the mobile device; and upon verifying that the one or more conditions are satisfied, causing an application subsystem of the mobile device to switch from a dormant mode to an active mode.

Other embodiments of this aspect include corresponding systems, apparatus, and computer programs, configured to perform the actions of the methods, encoded on computer storage devices.

These and other embodiments can optionally include one or more of the following features.

In some implementations, the one or more conditions includes that two consecutive position fixes resulted from the monitoring indicate a crossing of a geofence by the mobile device.

In some implementations, causing the application subsystem of the mobile device to switch from the dormant mode to the active mode is performed by the baseband subsystem of the mobile device.

In some implementations, the method further includes: after the application subsystem of the mobile device switches from the dormant mode to the active mode, invoking an application program in the application subsystem of the mobile device, where the application program utilizes the current location of the mobile device as an input.

In some implementations, the method further includes: after the application subsystem of the mobile switches from the dormant mode to the active mode, resuming execution of an application program in the application subsystem of the mobile device, where the application program utilizes the current location of the mobile device as an input.

In some implementations, monitoring the current location of the mobile device using the baseband subsystem further includes: periodically obtaining Global Positioning System (GPS) location coordinates representing the current location of the mobile device using an on-board GPS system of the baseband subsystem.

In some implementations, the method further includes: verifying, using the baseband subsystem, that the one or more conditions are satisfied based on the current location further includes: determining, using the baseband subsystem, that two set of consecutively obtained GPS location coordinates indicate a crossing of a geofence associated with the mobile device by the mobile device.

In some implementations, the method further includes: monitoring, using the baseband subsystem, a respective current value for each of one or more parameters characterizing a signal received from a transmitter of a cellular network base station; correlating, using the baseband subsystem, the respective current values for the one or more parameters with the GPS location coordinates representing the current location of the mobile device; and providing, to a server, data containing the correlated respective current values for the one or more parameters and GPS location coordinates, wherein the server utilizes at least the data to generate a profile of the cellular network base station.

In another aspect, a method includes: receiving, from each of a first plurality of mobile devices, respective correlated location and cellular signal information, wherein the respective correlated location and cellular signal information contains respective values of one or more parameters characterizing a respective signal received by the mobile device from a transmitter of a cellular network base station, and a Global Positioning System (GPS) location fix representing a location at which the respective signal was received by the mobile device, and wherein the GPS location fix and the signal were obtained using the baseband subsystem of the mobile device; and generating a profile of the cellular network base station based at least in part on the respective correlated location and cellular signal information received from the plurality of mobile devices.

Other embodiments of this aspect include corresponding systems, apparatus, and computer programs, configured to perform the actions of the methods, encoded on computer storage devices.

These and other embodiments can optionally include one or more of the following features.

In some implementations, the one or more parameters characterizing the respective signal received from the transmitter of the cellular network base station include on one or more of an identifier for a provider of the cellular network base station, a cell ID for the transmitter of the cellular network base station, a transmission timestamp of the signal, a receipt timestamp of the signal, a strength of the signal, a phase of the signal, and an angle of arrival of the signal.

In some implementations, the profile of the cellular network base station includes a respective estimate for each of one or more profile parameters including a clock error, a base station location, a coverage area, and a maximum signal strength associated with the cellular network base station.

In some implementations, the method further includes: maintaining a base station almanac including respective profiles of a plurality of cellular network base stations, where each respective profile is generated and updated based at least in part on respective correlated location and cellular signal information received from respective baseband subsystems of a respective plurality of mobile devices.

In some implementations, the method further includes: receiving, from a second mobile device, a request to self-locate based at least in part on respective cellular signals received from the transmitter of the cellular network base station by the second mobile device; and utilizing the profile of the cellular network base station in responding to the request.

The baseband on-board location monitoring and related functions described in this specification can be implemented to achieve the following exemplary advantages.

On a mobile device, a baseband subsystem can be less power consuming than an application subsystem. The application subsystem, including various functions implemented in the application subsystem, can stay dormant in a power saving mode until certain conditions related to the current location of the mobile device are satisfied. When the location monitoring and the decision logic associated with these conditions are implemented in the baseband subsystem of the mobile device, the baseband subsystem can invoke the application subsystem on an "as needed" basis. This allows the application subsystem to remain in a power-saving mode until needed, thus conserves battery power of the mobile device.

In addition, real-time location information can be collected and correlated with other information describing the current state of a mobile device without the active participation of the application subsystem of the mobile device. The correlation between a location and data characterizing a cellular signal received by a mobile device while at the location can be collected by a server from the mobile device without causing significant interference or cost to the mobile device. The server can use such correlated location and cellular signal data received from a large number of mobile devices, over a period of time, and over a large geographic area to derive profiles of cellular network base stations that had transmitted the cellular signals to the mobile devices. Thus, a base station almanac can be created from the "crowd sourced," correlated location and cellular signal data quickly and inexpensively, as compared to conventional ways of building and maintaining a base station almanac.

In addition, "crowd sourced" base station almanac information can be downloaded by individual mobile devices from the server in bundles and from time to time, where each bundle of information can include base station profiles of all base stations in a geographic area in which the user is likely to move about from its current location. Equipped with the bundle of base station profile information, the mobile device can move from location to location within the geographic area covered by the bundle of base station profile information, and perform cellular-based or cellular-assisted self-position without contacting the server or the network carrier(s) for such information each time the mobile device moves to a new location. By reducing the frequency that the mobile device needs to contact the server for base station profile information, battery power can be conserved. In addition, the mobile device can perform self-positioning using its baseband subsystem without contacting the server, thus, the processing power of the server can also be conserved.

In addition, how frequently base station profile information is downloaded from the server and how much information is downloaded each time, can be adjusted for each mobile device depending on various factors, such as the movement range of the mobile device, whether and how frequently high speed network connections (e.g., WiFi or 3G) are available to the mobile device, memory capacity of the system (e.g., the baseband subsystem or the application subsystem) that is requesting the download, and so on. Thus, further opportunities for optimizing the mobile device operations can be enabled.

The details of one or more implementations of baseband location monitoring and related functions are set forth in the accompanying drawings and the description below. Other features, aspects, and advantages of baseband onboard location monitoring will become apparent from the description, the drawings, and the claims.

BRIEF DESCRIPTION OF THE DRAWINGS

Like reference symbols in the various drawings indicate like elements.

DETAILED DESCRIPTION

Figure 1:
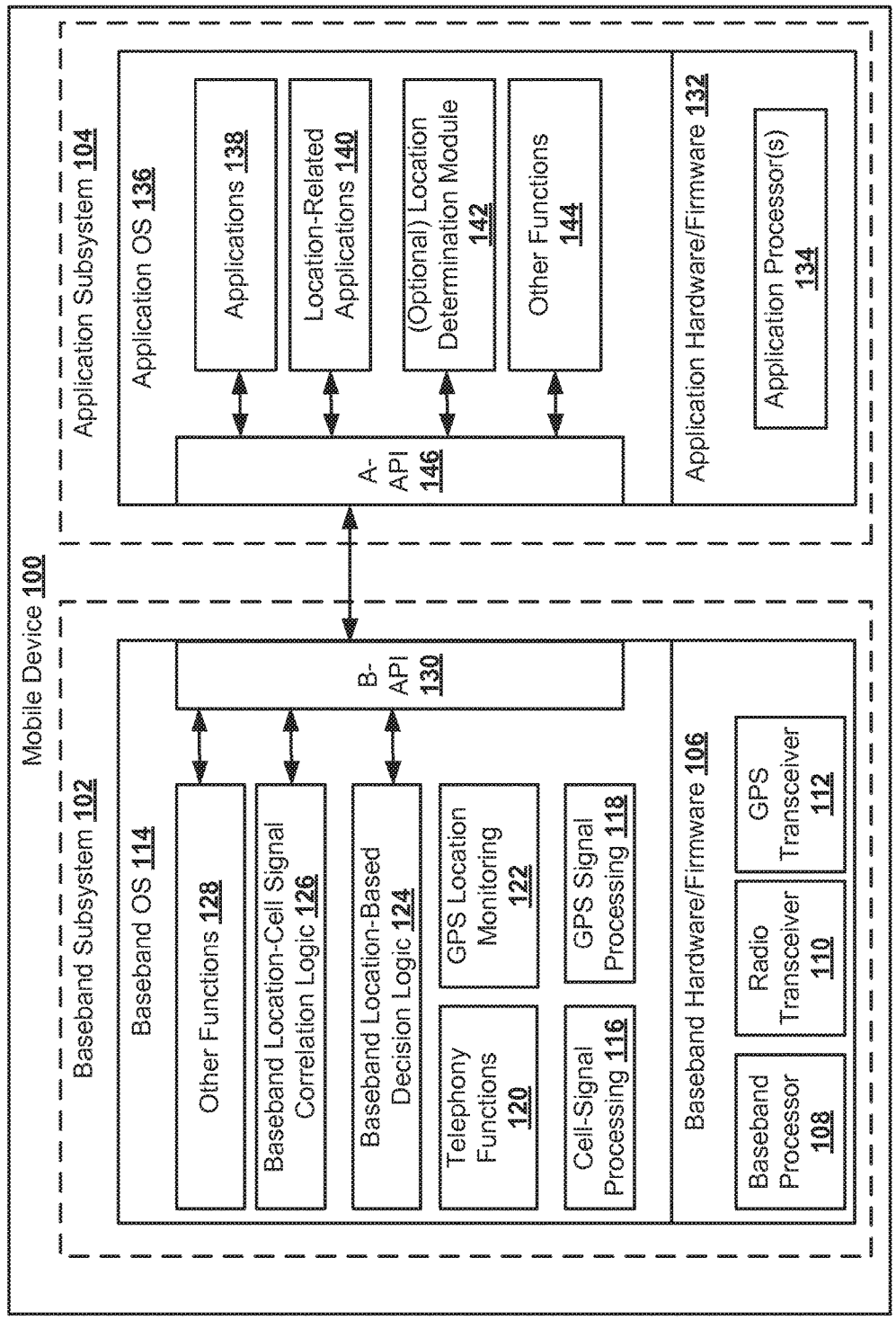
FIG. 1 is a block diagram illustrating a baseband subsystem and an application subsystem of a mobile device.

Overview of Baseband Location Monitoring and Related Functions

A modern mobile device, such as a smart phone, a personal data assistant, or a tablet PC, typically includes a baseband subsystem and an application subsystem. The baseband subsystem of a mobile device typically implements a real-time operating system (RTOS), and can generate a "real-time" response (or a response within a short, predetermined timeframe) in reaction to an external event (e.g., an incoming call) detected by the operating system. The baseband subsystem typically remains in a constant active mode and continues to scan for, receive, and process radio wave signals emitted from transmitters of one or more nearby base stations of a cellular telecommunication network, even when the mobile device is not engaged in an active telephone call. Examples of a cellular telecommunications network include Global System for Mobile Communication (GSM) networks, General Packet Radio Service (GPRS) networks, Code Division Multiple Access (CDMA) networks, Enhanced Data Rates for GSM Evolution (EDGE) networks, and so on.

The application subsystem of a mobile device can typically switch between an active mode and a dormant mode, where software applications can be launched and instructions of application programs can be executed in the application subsystem when the application subsystem is in the active mode. Program execution can be terminated or paused indefinitely when the application subsystem goes into the dormant mode. Some mobile devices can automatically switch their application subsystems into the dormant mode when the application subsystems have been idle for a predetermined duration, and switch the application subsystems back to the active mode when particular events is detected (e.g., when a user input is received).

Typically, the application subsystem consumes more power than the baseband subsystem when both subsystems are in their respective active modes. Switching the application subsystem into the dormant mode helps conserve battery power of the mobile device at the expense of suspending the functions and services provided by the application subsystem.

As described in this application, active location monitoring, in particular, Global Positioning System (GPS) location monitoring, is implemented in the baseband subsystem of a mobile device. By implementing a GPS positioning system within the baseband subsystem of the mobile device, GPS location fixes of the mobile device can be obtained continuously or periodically on the mobile device without active participation of the application subsystem. Additional location-related functions can be implemented in the baseband subsystem having the built-in baseband GPS positioning capabilities, which can lead to power saving and/or enable additional location-related functionalities without significant increase in power consumption.

In one example, some location-related decision logic can be implemented in the baseband subsystem of the mobile device. The mobile device can use the baseband subsystem to verify whether certain conditions are satisfied by the current location of the mobile device, and selectively activate the application subsystem and optionally launch particular location-related applications within the activated application subsystem, upon confirmation that the certain conditions are satisfied. Such selective activation of the application subsystem upon satisfaction of particular location-based conditions provides opportunities to conserve battery power for the mobile device.

In another example, the baseband subsystem of a mobile device can correlate GPS location fixes obtained by the baseband GPS positioning system with various parameter values characterizing cellular signals received by the mobile device at the locations represented by the GPS location fixes. The correlation can be made according to the respective receipt timestamps associated with the GPS location fixes and cellular signals, for example. The parameter values characterizing a cellular signal include, for example, an identifier of a cellular network provider, a cell ID, a transmission timestamp, a receipt timestamp, a signal strength, a signal phase, an impinging angle, and so on, associated with the cellular signal. The correlated location and cellular signal information can be provided to a server, e.g., by the baseband subsystem, periodically or immediate after the correlation is completed.

Because the mobile device can correlate the location and cellular signal information, and provide the correlated information to the server without involving the application subsystem, the power consumption of the mobile device would not be significantly increased due to the implementation of such functions. In addition, the frequencies at which the location monitoring, data correlation, and data uploading to the server are performed can be adjusted based on the current battery level of the mobile device, further reducing the impact of such functions on the overall performance and user experience of the mobile device.

As described in this application, the server can receive the correlated location and cellular signal information from a large number of mobile devices that have the baseband location monitoring enabled. The server can utilize the correlated location and cellular signal information to derive information about the transmitters of cellular network base stations from which the cellular signals were transmitted to those mobile devices. The information derived about the transmitters of the base stations can be used to compile a base station almanac, independent of and/or in addition to any data provided by the network carriers of the base stations.

In addition, the base station almanac can be built using information received from the mobile devices that are carried around to different locations by users during their daily activities. No specialized equipment needs to be sent to various locations in a systematic way to collect the data used to build the base station almanac. By "crowd sourcing" the correlated location and cellular signal information from a large number of widely distributed mobile devices, the base station almanac can be established more quickly and at a lower cost, can include more information about the base stations, and can be revised and updated more frequently, as compared to a base station almanac built by a cellular network provider using conventional methods and specialized equipment. In addition, the base station almanac built using the "crowd sourced" data can cover base stations of multiple network providers, since the correlated location and cellular signal information can be collected from mobile devices that subscribe to the services of multiple different cellular network providers.

In one example, the server can use the base station almanac established using the "crowd sourced" location and cellular signal information to provide cell-based positioning services to other mobile devices that do not have on-board GPS positioning systems, and/or that do not have an active built-in GPS positioning system in the baseband subsystem. For example, a mobile device can provide correlated location and cellular signal data to the server when GPS signals are available, and can request (e.g., using either the baseband subsystem or the application subsystem) cell-based positioning services from the server when the mobile device is moved inside a building where GPS signals are no longer available.

For another example, a mobile device can request and the server can provide bundles of base station profiles to the mobile device, from time to time. Each bundle of base station profiles can include profile information of all base stations in a geographic area that is associated with the mobile device. The geographic area can be an area encompassing the current location of the mobile device and other locations that the mobile device is likely to travel to in the near future. For example, base stations covered in a bundle of profile information can be all base stations within a certain radius of the mobile device's current location, or all base stations of the city, state, or country in which the mobile device is located. The mobile device can store the bundle of base station information, and use that information to perform cellular-based self-positioning (e.g., cell-based triangulation), or cellular-assisted self-positioning (e.g., Assisted-GPS positioning) without contacting the server or any cellular network carrier for the needed base station information. The mobile device can request an update for the bundle of profile information from time to time (e.g., when the application subsystem is active, when high-speed WiFi network connection is available, or when the mobile device has moved out of the geographic area covered by the current bundle of base station information, etc.).

As described in this specification, other types of location-related functions can also be implemented in the baseband subsystem of a mobile device. In some implementations, a software application can have parts reside in the baseband subsystem and parts reside in the application subsystem. The different parts of the software application can communicate with each other through application programming interfaces (APIs) implemented in either or both of the subsystems. Program execution in the application subsystem can be started and paused by the program execution in the baseband subsystem on an "as needed" basis to improve the overall power management for the mobile device.

Exemplary Mobile Device Architecture Implementing Baseband Location Monitoring

FIG. 1 is a block diagram illustrating a baseband subsystem 102 and an application subsystem 104 of an example mobile device 100. The mobile device 100 can be, for example, a handheld computer, a personal digital assistant (PDA), a cellular telephone, an electronic tablet, a camera, a smart phone, a portable media player, a navigation device, a game console, or a combination of any two or more of these data processing devices or other data processing devices.

The baseband subsystem 102 includes hardware and firmware components 106 that form the physical layer for communicating with other devices and carrying out functions implemented in the baseband subsystem 102. For example, the baseband hardware and firmware components 106 can include one or more baseband processors 108, one or more radio transceivers 110 for transmitting and receiving radio wave signals to and from nearby cellular network base stations, and one or more GPS transceivers 112 for transmitting and receive radio wave signals to and from one or more GPS satellites that are within communication range with the mobile device 100. In some implementations, the baseband subsystem 102 can also include other hardware and firmware components, such as a WiFi transceiver, an accelerometer, a gyro, an AM/FM radio receiver, and a flash memory module, for example.

As shown in FIG. 1, a baseband operating system 114 can be implemented over the physical layer of the baseband subsystem 102. For example, the baseband operating system 114 can be executed by the baseband processor 108, and include programs that control the hardware and firmware components 106 in the baseband subsystem 102. In some implementations, the baseband operating system 114 can also include a Baseband Application Programming Interface (B-API) through which the baseband operating system 114 communicates with other components of the mobile device 100, such as the application subsystem 104 of the mobile device 100.

Within the baseband subsystem 102, the baseband operating system 114 can support multiple program modules that control the various hardware/firmware components of the mobile device 100 and communicate with the application subsystem 104 and/or other subsystems of the mobile device 100. For example, the baseband subsystem 102 can include a cell-signal processing module 116 that controls the radio transceiver 110 and processes the radio wave signals received from nearby transmitters of cellular network base stations. The cell-signal processing module 116 can continuously decode each signal (e.g., a pulse or sequence of pulses in the radio waves sensed by the radio transceiver 110) into a discrete set of parameter values characterizing the signal.

In some implementations, the set of parameter values that characterize the received cellular signal can include a carrier identifier and a cell ID associated with the transmitter that transmitted the signal to the mobile device 100. The carrier identifier identifies a cellular network provider associated with the base station and transmitter. The cell ID identifies a particular sector (or "cell") that the transmitter's transmission range can cover. Respective values for the carrier identifier and cell ID can be uniquely encoded in the sequence of pulses in the signals transmitted by each transmitter of each cellular base station, and decoded by a mobile device subscribing to the services of the network provider of the base station.

Other information can be encoded in each signal transmitted by a transmitter of a base station. For example, a transmission timestamp showing the time at which a signal departed from the transmitter can be encoded in the signal. The value shown in the transmission timestamp is specified according to a clock used at the base station of the transmitter. When the signal is received by the radio transceiver 110 of the baseband subsystem 102 of a mobile device, a receipt timestamp can be given to the signal. The receipt timestamp shows the time at which the signal arrived at the radio transceiver 110 according to the clock used by the baseband subsystem 102.

The clock time at each base station can be slightly different from one another, and/or from the clock times at different mobile devices that receive signals from the base station. For example, different clocks can be synchronized to different reference clocks, and different clocks can drift by different amounts over time even if the clocks had been synchronized to the same reference clock in the past. Therefore, the transmission timestamp encoded in the signal contains a transmitter specific clock error relative to the real time at which the signal departed from the transmitter, while the receipt timestamp of the signal at a mobile device 100 includes a mobile device specific clock error relative to the real time at which the signal is received by the radio transceiver 110 of the mobile device 100.

Since both the transmission timestamp and the receipt timestamp of a received cellular signal can contain a respective clock error, the recorded travel time of the signal between the transmitter and the receiver as calculated based on the difference between the transmission timestamp and the receipt timestamp contains a combined clock error relative to the real travel time. Consequently, a distance calculated based on the recorded travel time and the average speed of the cellular signal in air is only a rough estimate of the real distance between the transmitter and the receiver.

As will be disclosed later (e.g., in FIG. 4 and accompanying descriptions) in this specification, this rough estimate of the real distance can nonetheless be used, in conjunction with the respective rough estimated distances between the transmitter and other mobile devices, to provide an estimate of the location of the transmitter, and hence the location of the base station of the transmitter. Furthermore, the estimated location of the transmitter calculated based on data collected from mobile devices at multiple locations can then be used to calculate a more accurate estimate of the real distance between the transmitter and each of the mobile devices. The difference between the more accurate estimate of the real distance and the rough estimate of the real distance can be used to calculate an estimate of the combined clock error of the base station and the mobile device.

Besides the carrier identifier, the cell ID, the transmission timestamp, and the receipt timestamp, other parameters that characterize a cellular signal received by the radio transceiver 110 of the baseband subsystem 102 can include the signal strength, the signal phase, and the signal to noise ratio, for example.

As radio waves travel through air and across obstacles along its path to the radio transceiver 110 of the mobile device 100, the strength or magnitude of the radio waves become increasingly attenuated with distance. The signal attenuation is also more pronounced when the radio waves pass through buildings or other dense materials. Therefore, the signal strength sensed at the radio transceiver 110 of the mobile device 100 reflects not only the original strength or power of the transmitter, but also the terrain and obstacles along the path of the signal between the transmitter and the receiving mobile device. The signal phase and signal to noise ratio of the signal also reflect the surrounding environment (e.g., buildings, structure of the building, current load of the base station, etc.) through which the signal travels to the receiving mobile device.

As described later in this specification (e.g., in FIG. 3 and the accompanying descriptions), the parameters characterizing a received cellular signal can be correlated with the location of the mobile device when the cellular signal was received by the mobile device. The correlated signal and location information can be utilized by a server in deriving a profile of the base station that transmitted the signal. The profile can include information about the base station such as the carrier identifier, the cell ID, the maximum signal strength, a surrounding terrain, coverage range, a signal strength map within the coverage range, surrounding base stations, existence of signal boosters within the cell sector, and so on.

Referring back to FIG. 1, in addition to the cell-signal processing module, the baseband subsystem 102 also includes a telephony function module 120. The telephony function module 120 is responsible for providing the basic telephony functions of the mobile device 100. The telephone function module 120 can include software instructions and interfaces for communicating with the cell-signal processing module 116 and the user interfaces of the mobile device 100 to establish and sustain active call connections with another telephony device (e.g., a mobile phone or land phone).

In some implementations, while the mobile device 100 has established an active call through a base station of a cellular network carrier, the clock of the mobile device 100 can be synchronized to the clock of the base station, and a more accurate distance between the mobile device 100 and the transmitter of the base station can be calculated according to the recorded travel time (e.g., the difference between the receipt timestamp and the transmission timestamp) of the cell signal and the known speed of the radio waves in air. In some implementations, the parameters characterizing a received cellular signal can indicate whether the signal was received during an active call where the clock of the mobile device 100 was synchronized to the base station clock.

In some implementations, since the onboard GPS system (e.g., the GPS transceiver 112 and the GPS-signal processing module 118) generally provides a more accurate clock time than a base station does, the clock of the mobile device 100 can be synchronized to the GPS time when GPS signals are available to the mobile device 100. When the clock of the mobile device 100 is synchronized with GPS time, the clock error of the mobile device 100 can be considered to be negligible compared to the clock errors at various base stations.

As shown in FIG. 1, the mobile device 100 includes an onboard GPS system in the baseband subsystem 102. The onboard baseband GPS system includes hardware and firmware components, such as the GPS transceiver 112. The onboard baseband GPS system also includes software modules executing in the baseband operating system 114, such as a GPS-signal processing module 118 and a GPS location monitoring module 122. The GPS transceiver 112 can communicate with one or more GPS satellites to obtain a current location fix for the mobile device 100. The current GPS location fix can be expressed in terms of a pair of latitude and longitude coordinates representing the current location of the mobile device 100. The current location fix can also be given a GPS timestamp, representing the time at which the mobile device is found to be located at the position indicated by the GPS location fix.

In some implementations, the GPS location monitoring module 122 can be used to control the GPS signal processing module 118 and the GPS transceiver 112. For example the GPS location monitoring module 122 can be used to adjust how frequently the GPS location fixes are obtained from the GPS satellites. The telephony functions and the baseband GPS location monitoring can each utilize part of the processing power and clock cycles of the baseband processor 108. In some implementations, the GPS location monitoring module 122 can adjust the frequency of the GPS location fixes based on a current usage of the processing cycles by other subsystems in the baseband subsystem 102, and/or on a remaining batter level of the mobile device 100, for example.

Since, as shown in FIG. 1, the GPS system is implemented in the baseband subsystem 102 of the mobile device 100, GPS location fixes can be obtained much more frequently and at a lower power cost, as compared to the case where the GPS system is part of the application subsystem of a mobile device, especially when the GPS location monitoring can utilize some of the underutilized clock cycles on the baseband processor 108.

The GPS location information (e.g., the GPS (latitude, longitude) coordinates and associated GPS timestamp) obtained through persistent baseband GPS location monitoring can be utilized by some location-based decision logic 124 implemented in the baseband subsystem 102. The location-based decision logic 124 can verify whether the current location or change in location of the mobile device 100 satisfy one or more predetermined conditions, and cause particular operations to be triggered upon the satisfaction of the conditions. In particular, the location-based decision logic can communicate with the application subsystem 104 of the mobile device 100, and cause operations to be triggered in the application subsystem 104 of the mobile device.

As shown in FIG. 1, the application subsystem 104 of the mobile device 100 includes application hardware and firmware components 132. The application hardware and firmware components 132 include at least an application processor 134. The application processor 134 can be a more powerful processor than the baseband processor 108 in terms of processing power and speed, but may consume more power than the baseband processor 108 when both are in an active mode. The application subsystem 104 can also include an application operating system 136 in which user applications, including location-related applications 140 and other user applications 138, can be installed and executed. Other functions 144, such as user interfaces functions, Input/Output functions, WiFi communication functions, and so on, can also be implemented in the application operating system 136. In some implementations, the application subsystem 104 can also include an optional location determination module 142 that can be used by the mobile device to self-locate when the baseband GPS location monitoring cannot be utilized (e.g., when the mobile device 100 is inside a building where no GPS signals are available). The application subsystem 104 can also include a communication interface (e.g., an application subsystem API 146) for communicating with other devices and/or the baseband subsystem 102.

Referring back to the baseband subsystem 102, when the location-based decision logic 124 determines that one or more predetermined conditions are satisfied, the location-based decision logic 124 can send a communication signal to the application subsystem 104, for example, through the APIs 130 and/or 146. The communication signal can cause the application subsystem 104 to switch from an inactive or dormant mode to an active mode.

For example, if the application subsystem 104 has been in an idle state for an extended time, a power management process (not shown) of the application operating system 136 can cause the application operating system 136 to suspend or shut down, and the communication signal received from the location-based decision logic 124 can cause the application operation system 136 to wake up and resume operations of the system and application programs that were suspended. In some implementations, each condition implemented in the location-based decision logic 124 can also be associated with one or more particular applications installed in the application operating system 136, and cause the particular applications to be launched after the application operating system 136 is switched into the active mode.

In some implementations, the location-based decision logic 124 can store parameters defining the boundaries of a geofence, and based on the current location of the mobile device, the location-based decision logic 124 can determine whether the mobile device 100 has crossed the boundaries of the geofence since the time a previous GPS location fix was obtained.

In a more specific example, suppose a geofence is defined along the perimeter of a user's house. When the GPS location fix is continuously or periodically provided by the GPS location monitoring module 122 to the location-based decision logic 126, the location-based decision logic can compare two consecutively received location fixes to see if the mobile device 100 has moved from within the perimeter of the user's home to outside of the perimeter of the user's home. The location-based decision logic 124 can define the operations that are to be triggered when the mobile device 100 is found outside of the perimeter of the user's home. For example, the decision logic 124 can generate a communication signal to the application subsystem 104 and wake up the application subsystem 104 from its dormant state, and launch a traffic alert application installed in the application operating system 136 of the application subsystem 104. The application operating system 136 and the traffic alert application can be executed by the application processor 134 of the application subsystem 104 to provide the up-to-date traffic report on a route that the user typically takes after leaving home at around the current time (e.g., morning, evening, etc.). If the application subsystem was already in an active mode, the decision logic can simply send a communication signal to launch the traffic alert application. Alternatively, the application subsystem can ignore the communication signal for switching into the active mode, and only carry out the other instructions encoded in the communication signal.

In some implementations, when an application program is installed in the application subsystem 104, one or more location-related conditions can be provided to the baseband location-based decision logic 126, such that when these conditions are satisfied, the baseband location-based decision logic 124 can invoke and notify the application program of the fulfillment of the conditions. If the application subsystem 104 is not already active when the conditions are fulfilled, the baseband location-based decision logic 126 can first switch the application subsystem 104 from the dormant state to the active state, and then launch or resume the application program. The activated application program can perform operations according to the condition that is fulfilled or the current location of the mobile device.

For a more specific example, when a user application providing a dining guide is installed in the application operating system 136, one or more locations of a few selected restaurants can be provided to the location-based decision logic 124. When a GPS location fix provided by the GPS location monitoring module 122 is found to be in close proximity to one of the restaurant locations, the location-based decision logic 124 can invoke the application subsystem 104 if it is dormant, and invoke the user application, such that the user application can establish wireless communication with the restaurant near the current location of the mobile device 100 to retrieve and present a dining coupon to the user.

Other types of location-based decision logic 126 can be implemented in the baseband subsystem 102 that do not require participation of the application subsystem 104. For example, the location-based decision logic 124 and/or the location monitoring module 122 can communicate with other function modules 128 implemented in the baseband subsystem 102, and trigger operations to be performed by these other function modules. In some implementations, these other function modules 128 can include an auto-archive or auto-destruct function for the location fixes obtained by the location monitoring module 122, that periodically archive or delete the location fixes.

In some implementations, the baseband subsystem 102 can include a location-cell signal correlation module 126. When the current location of the mobile device 100 is determined by the onboard baseband GPS location monitoring module 122 at substantially the same time (e.g., within a predetermined time interval) as when the mobile device 100 receives a cellular signal, the location-cell signal correlation module 126 can correlate the GPS location data and the parameter values characterizing the cellular signal as contemporaneous data, and can be bundled as a set of correlated location and cellular signal data.

In one example, suppose that the GPS location fix is obtained less frequently than the cellular signals. The baseband location-cell signal correlation module 126 can compare of the receipt timestamp of a cellular signal the GPS time stamp of a GPS location fix, and if the difference is within a predetermined time interval, the location-cell signal correlation module can correlate the GPS location fix and the cellular signal. Once a GPS location fix and a received cellular signal are correlated according to their respective timestamps, a data package can be created by the baseband location-cell signal correlation module 126, where the data package include the GPS location fix (e.g., latitude, longitude, and a GPS timestamp) and the parameter values characterizing the cellular signal (e.g., carrier identifier, cell ID, receipt timestamp, transmission timestamp, signal strength, etc.). The baseband location-cell signal correlation module 126 can transmit the data package to a server immediately after the correlation is completed, or store the data package and send several data packages together at periodic intervals.

As the GPS location monitoring module 122 continues to receive new GPS location fixes for the mobile device 100 and the baseband subsystem 102 continues to receive cellular signals over time and as the mobile device 100 moves from location to location, the location-cell signal correlation module 126 can continue to generate new sets of correlated location and cellular signal data packages and send them to the server. The server can use the correlated location and cellular signal data received from many different mobile devices to derive profiles of the base stations that used the transmitters to broadcast the signals to the mobile devices.

In some implementations, the mobile device 100 can receive cellular signals from transmitters of multiple nearby base stations at the same time. The location-cell signal correlation module 126 can prepare separate correlated location and cellular signal data packages for the signals received from each transmitter. Alternatively, the location-cell signal correlation module 126 can prepare a single data package that correlate a GPS location fix with the respective set of parameter values characterizing the cellular signal received from each of the multiple transmitters.

In some implementations, the server can subsequently use the profile information of the base stations to provide cellular positioning services to other mobile devices that do not have active baseband GPS location monitoring enabled. For example, if the mobile device 100 is later moved into a building, and the onboard baseband GPS location monitoring is deactivated due to the lack of GPS signals inside the building, the optional location determination module 142 implemented in the application subsystem 104 can contact the server to obtain a cellular-based location fix for the mobile device 100. In some implementations, the profile information of the base station can be provided to the mobile device 100, and used by the location determination module 142 to perform triangulation using the application subsystem 104 of the mobile device 100. In some implementations, the mobile device 100 can provide the parameter values characterizing cellular signals received from two or more nearby base stations to the server, where the server can perform triangulation or other cellular based positioning for the mobile device 100, and provide a cellular-based location fix of the mobile device 100 back to the mobile device 100.

In some implementations, even if the application subsystem 104 is not active, the baseband subsystem 102 can also receive cellular-based positioning services from the server. For example, the baseband subsystem 102 can implement a location monitoring module that continues to receive location fixes from the server based on cellular signals received at the mobile device 100, when the GPS location monitoring is not active due to lack of GPS signals, for example, when the mobile device 100 is indoors. In some implementations, the baseband subsystem 102 can implement an automatic switching between GPS location monitoring and cellular location monitoring depending on the battery level, and the availability of the GPS signal or cellular signals at the current location of the mobile device 100.

In some implementations, the mobile device 100 can implement a function that requests and receives bundles of base station profiles from the server independent of a specific positioning request, and use the received bundles of base station profiles to perform subsequent cellular-based or cellular-assisted self-positioning without contacting the server or a network carrier for the necessary base station information again. For example, the application subsystem 104 of the mobile device 100 can implement a function to request such base station information bundles periodically (e.g., every day or every week) or to request an update for the information bundle each time a high speed network connection (e.g., WiFi, 3G, or 4G network connections) is established by the application subsystem 104 between the mobile device 100 and the server.

In some implementations, the application subsystem 104 can store and make the profile information downloaded from the server available to the baseband subsystem 102, such that the baseband subsystem can use to profile information to perform cellular-based self-positioning functions or to perform cellular-assisted GPS positioning functions, even with the application subsystem 104 is dormant and/or when the server is not available. These self-positioning functions using preloaded base station profile information can be implemented by the module 128 in the baseband subsystem 102, for example. In some implementations, the self-positioning functions using preloaded base station profile information can also be implemented in the location determination module 142 of the application subsystem 104.

In some implementations, when requesting a bundle of base station profile information from the server, the application subsystem 104 can send a current location fix (or current cellular signal information) to the server, so that the server can determine at least a rough location of the mobile device 100. The server can then identify a geographic area that encompass the current location of the mobile device and other locations that the mobile device can be expected to reach in the near future (e.g., in the next hour or the next day), and provide the profile information of all base stations that are within the geographic area to the mobile device 100 in an information bundle. The information bundle not only can include profiles of base stations from which the mobile device can receive cellular signals right now, but also base stations that are currently out of transmission range from the mobile device.

In some implementations, the geographic region covered by each base station information bundle can be the city, state, or country in which the mobile device is located when the request for the information bundle is made. In some implementations, the geographic region covered by each base station information bundle can be an area that is within a predetermined radius (e.g., 10 miles) from the current location of the mobile device when the request for the information bundle is made. In some implementations, the geographic region covered by a base station information bundle can be an area within a geofence (e.g., a home-to-work commute geofence) associated with a mobile device.

In some implementations, the application subsystem 104 of the mobile device 100 can request the base station information bundle periodically. For example, the periodicity of the requests can be set to every day, or every hour, or some other predetermined time period. In some implementations, the predetermined time period can be set by the server, for example, according to an effective time period associated with the information bundle. The effective time period can be the time period between the time of the information request to the time at which an update to the profile information bundle will be made available or needed. In some implementations, the application subsystem 104 can also request a new information bundle or update to the stored information bundle when the mobile device 100 has moved to an area not covered by the stored information bundle. In some implementations, if location monitoring is performed by the baseband subsystem 102, the baseband subsystem 102 can provide a signal to active a dormant application subsystem 104 and activate a high-speed network communication function in the application subsystem 104 to obtain the update to the base station information bundle or a new base station information bundle.

Although FIG. 1 shows that some modules of the baseband subsystem 102 as being implemented as software executing in the baseband operating system 114, a person skilled in the art can appreciated that part or all of these modules can also be implemented as hardware, firmware, software, or combinations of two or more thereof in the baseband subsystem 102.

In some implementations, other information that characterizes the current state of the mobile device 100 can also be correlated with the cellular signal and GPS location fixes received at the mobile device 100. Such other information includes, for example, a current acceleration or speed of the mobile device 100, whether the application subsystem 104 is currently active, whether the user is in an active call, and so on. These other information can also be used as part of the basis to verify whether certain conditions are satisfied. These other information can also be bundled with the correlated location and cellular signal data packages and sent to the server to create other "crowd sourced" datasets (e.g., distribution maps for various demographics).

Activation of Application Subsystem Based on Baseband Location Monitoring

Figure 2:
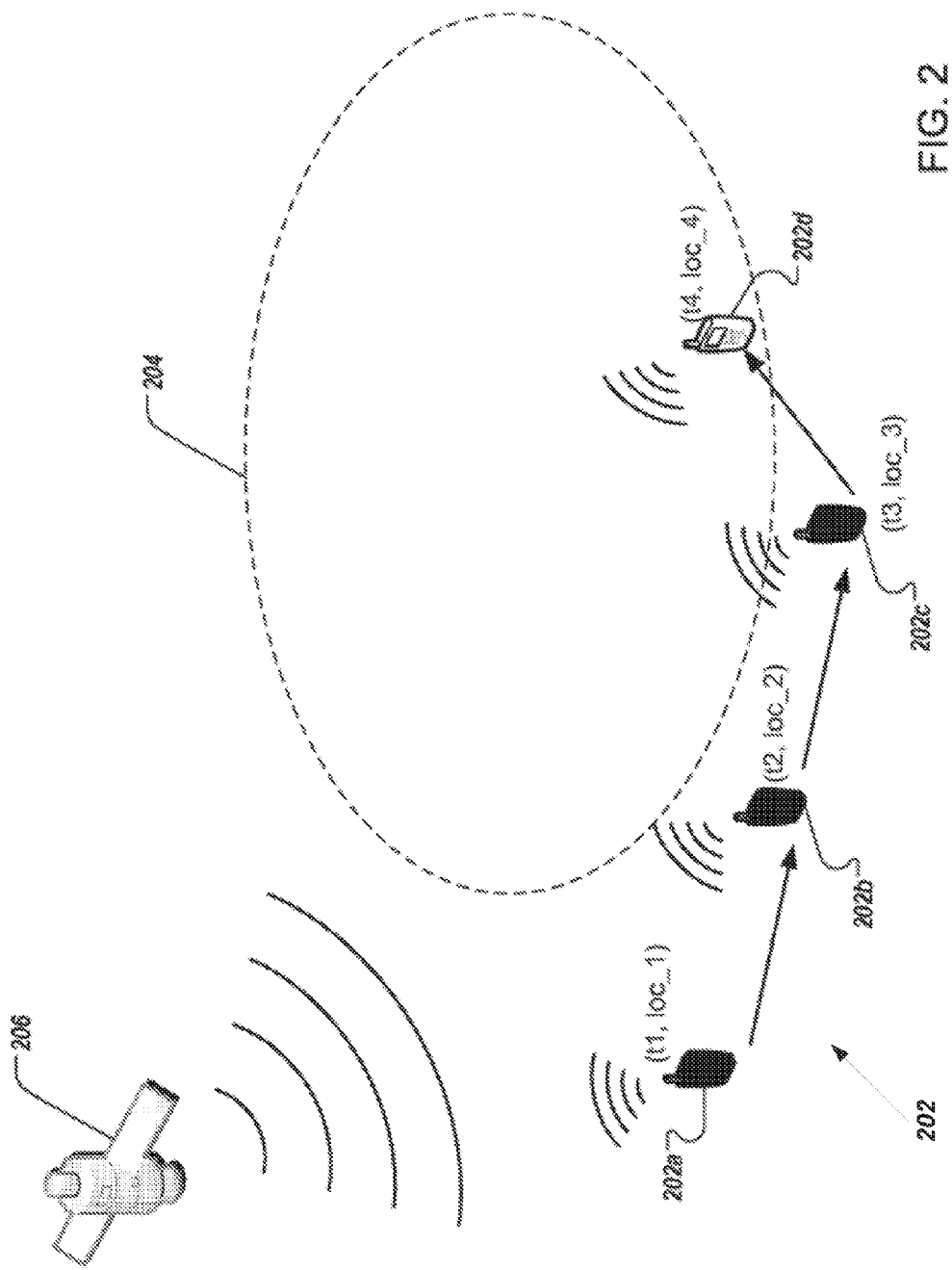
FIG. 2 is a block diagram illustrating baseband onboard location monitoring in conjunction with decision logic for invoking the application subsystem based on the crossing of a geofence by the mobile device.

FIG. 2 is a block diagram illustrating baseband onboard location monitoring working in conjunction with baseband location-based decision logic for invoking the application subsystem of a mobile device 202 upon the crossing of a geofence 204 by the mobile device 202.

As shown in FIG. 2, the mobile device 202 communicates with one or more GPS satellites 206 to obtain GPS location fixes for the mobile device 202. A GPS location monitoring module is implemented in the baseband subsystem of the mobile device 202, and can continuously or periodically obtain the GPS location fixes without the participation of the application subsystem of the mobile device 202. For example, as indicated in FIG. 2, the mobile device 202 communicates with the GPS satellites 206 using only the baseband subsystem of the mobile device 202, and the application subsystem of the mobile device 202 is in a dormant state. Thus, the mobile device 202 is in an overall power saving mode (e.g., as indicated by the dimmed view of the mobile device 202 in FIG. 2).

As the mobile device 202 moves from location to location (e.g., from location "loc_1", corresponding to mobile device location 202a, to location "loc_2," corresponding to mobile device location 202b, then to location "loc_3, corresponding to mobile device location 202c, and then to location "loc_4, corresponding to mobile device location 202d,) over time (e.g., from time "t1" to time "t2," then to time "t3," and then to time "t4"), the baseband subsystem of the mobile device 202 compares each of the GPS location fixes of the mobile device 202 to the boundaries of the geofence 204. When each change of the current location of the mobile device 202 does not indicate that the mobile device 202 has crossed the geofence 204 (e.g., when the mobile device 202 is moved from "loc_1" to "loc_2," and then to "loc_3"), the application subsystem of the mobile device 202 can remain in the dormant mode. When a change of the current location of the mobile device 202 indicates that the mobile device 202 has just crossed the geofence 204 (e.g., when the mobile device 202 is moved from "loc_3" to "loc_4," the location-based decision logic in the baseband subsystem of the mobile device 202 can trigger the application subsystem of the mobile device 202 and switch the application subsystem of the mobile device 202 from the dormant mode to the active mode (e.g., as indicated lightened view of the mobile device 202 in FIG. 2).

FIG. 2 is merely an illustration of how baseband location-based decision logic can be used in conjunction with the baseband location monitoring to conserve power and/or provide useful functionalities on the mobile device. Other functions can be implemented using the baseband location-based decision logic as well.

Crowd Sourcing of Baseband Location-Cell Signal Information

Figure 3:
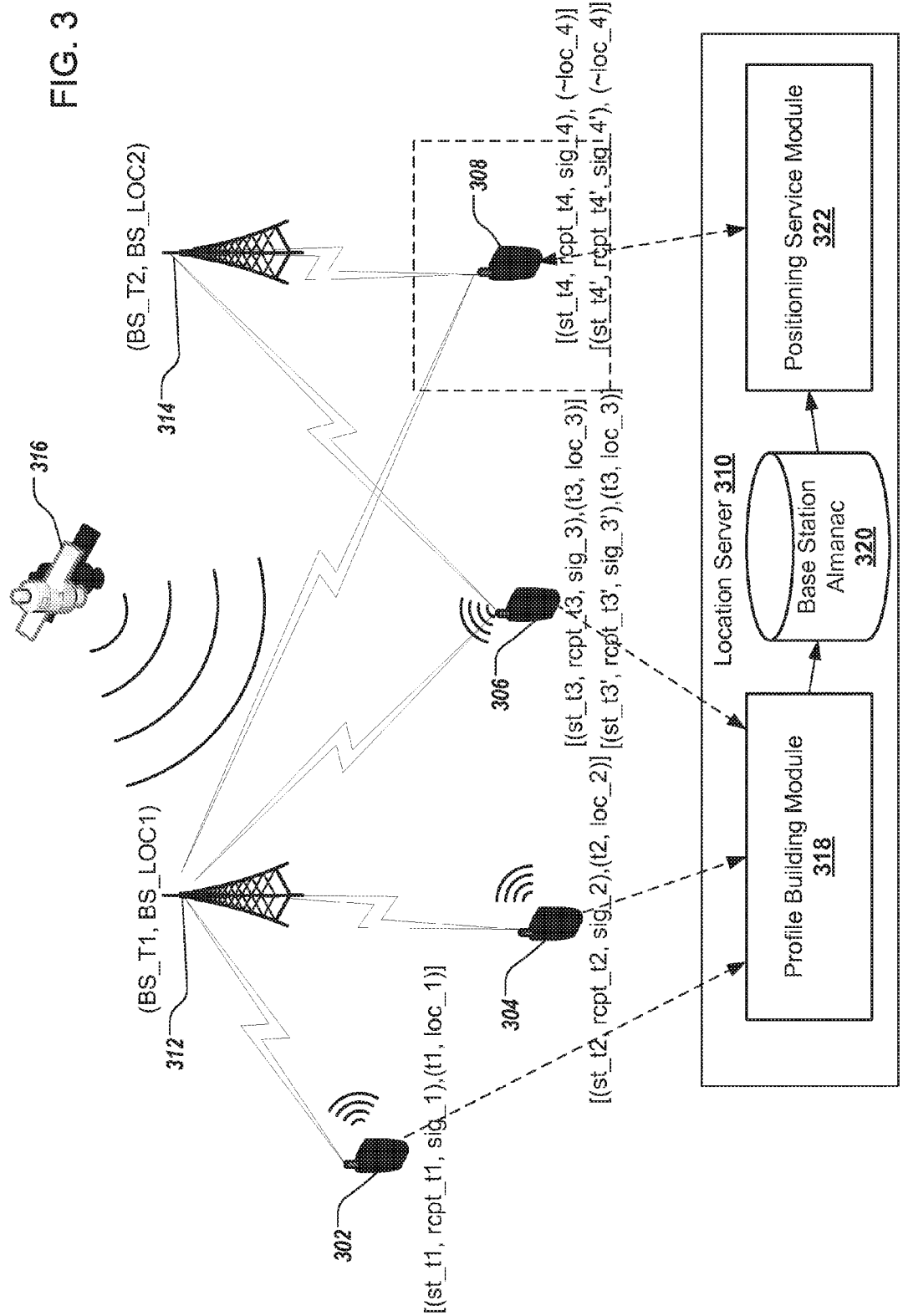
FIG. 3 is a block diagram illustrating the collection of correlated location and cellular signal information from multiple mobile devices having baseband GPS location monitoring enabled, the use of the information to generate a base station almanac, and the use of the base station almanac to provide cell-based positioning services to other mobile devices.

FIG. 3 is a block diagram illustrating the collection of correlated location and cellular signal information from multiple mobile devices (e.g., mobile devices 302, 304, and 306) having baseband GPS location monitoring enabled and the use of the information by a server 310 to provide cellular-based positioning services to other mobile devices (e.g., mobile device 308) that do not have baseband GPS location monitoring enabled.

As shown in FIG. 3, when multiple mobile devices 302, 304, and 306 are within the transmission range of a transmitter 312 of a cellular base station located at a base station location "BS_LOC1," the multiple mobile devices 302, 304, and 306 can each receive cellular signals from the transmitter 312. The cellular signals are characterized by a transmission timestamp (e.g., "st_t1" for mobile device 302, "st_t2" for mobile device 304, and "st_t3" for mobile device 306) according to the clock at the base station and a receipt timestamp (e.g., "rcpt_t1" for mobile device 302, "rcpt_t2" for mobile device 304, and "rcpt_t3" for mobile device 306) according to the clock at the mobile device, and other parameter values (e.g., "sig_1" for mobile device 302, "sig_2" for mobile device 304, and "sig_3" for mobile device 306). Some mobile devices (e.g., mobile devices 306 and 308) can receive cellular signals from more than one transmitters (e.g., the transmitters 312 located at "BS_LOC1" and a transmitter 314 located at "BS_LOC2"), and a respective set of parameter values can be used to characterize each signal received from each of the transmitters.

Each of the multiple mobile devices 302, 304, and 306 can also have onboard baseband GPS location monitoring enabled, and can receive GPS location fixes from one or more GPS satellites 316. Each GPS location fix includes a pair of position coordinates (e.g., location "loc_1" for mobile device 302, location "loc_2" for mobile device 304, and location "loc_3" for mobile device 306) and a GPS timestamp (e.g., "gps_t1" for mobile device 302, "gps_t2" for mobile device 304, and "gps_t3" for mobile device 306) associated with the position coordinates.

The location-cell signal correlation module in the baseband subsystem of the mobile devices 302, 304, and 306 can correlate the cell signals they receive from the transmitter 312 (and the transmitter 314 for mobile device 306) with their respective GPS locations fixes according to the receipt timestamps given to the cellular signals and the GPS timestamps associated with the GPS location fixes. Each of the mobile devices 302, 304, and 306 can further send data packages including the correlated location and cellular signal data to the server 310. In some implementations, the uploading of correlated location and cellular signal data can be performed by the baseband subsystem of the mobile device immediately after the correlation is completed. Alternatively, the mobile device can store the correlated location and cellular signal data until the application subsystem is active, and upload the correlated location-cellular signal data accumulated since the last upload.

Figure 4:
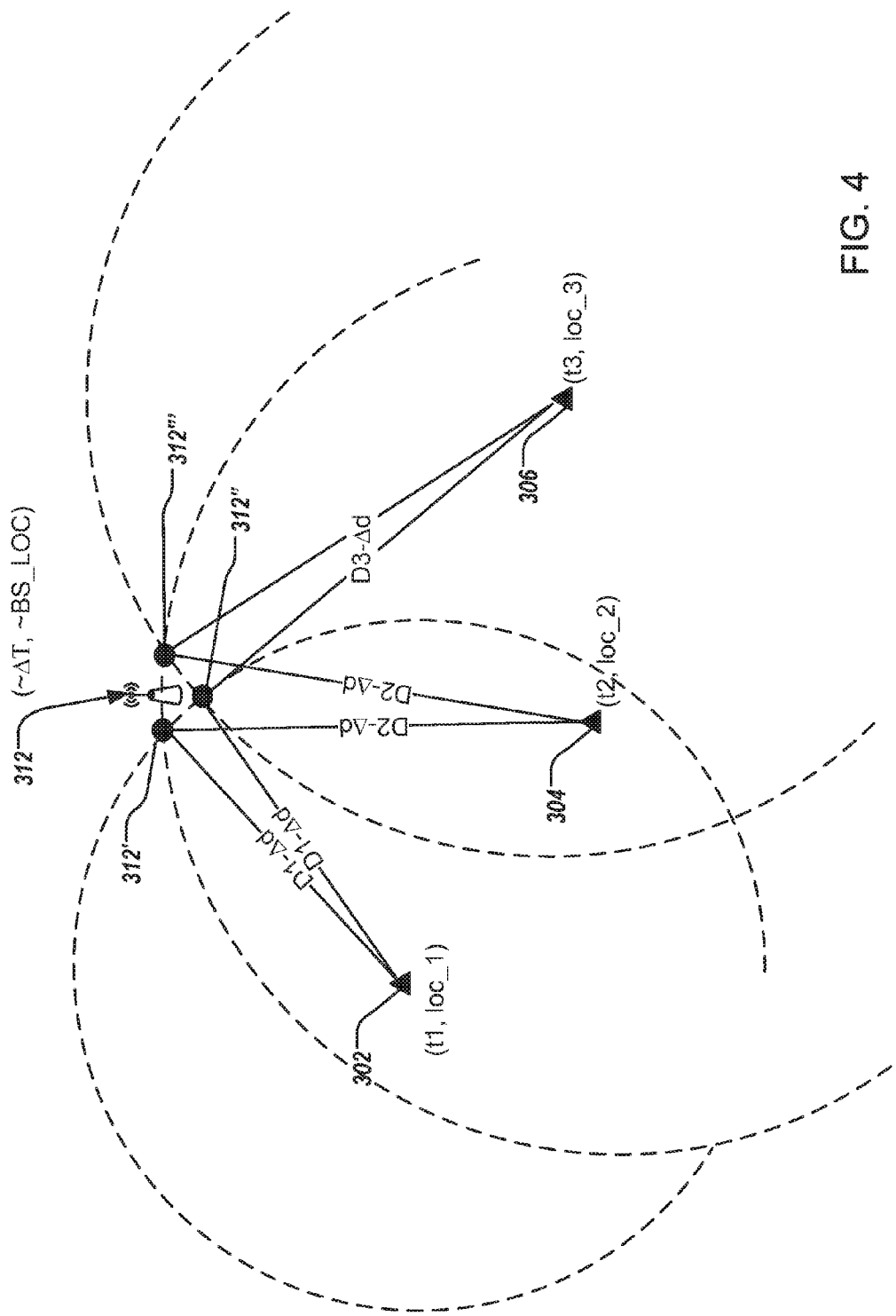
FIG. 4 is a block diagram illustrating an example of how multiple sets of correlated location and cellular signal information are used to derive an estimated location and an estimated clock error for a cellular network base station.

The server 310 can receive data packages containing the correlated location and cellular signal data from multiple mobile devices that had received signals from transmitters of different cellular base stations while the mobile devices were at different locations and/or at different times. A profile building module 318 of the server 310 can utilize the data packages received from the multiple mobile devices (e.g., mobile devices 302, 304, and 306 to derive respective characteristics of the transmitters (e.g., the transmitter 312) and the base stations utilizing the transmitters. FIG. 4 illustrates an example process for deriving an estimated location and an estimated clock error for the transmitter 312 based on the correlated location and cellular signal data received from the mobile devices 302, 304, and 306.

In some implementations, a mobile device can correlate a GPS location fix with a cellular signal where both were received when the mobile device was stationary. In such implementations, the cellular signal can be correlated with a location fix as long as the cellular signal is received while the mobile device remains stationary at that location. In other words, when the mobile device is stationary, a large difference between the receipt timestamp of the cellular signal and the GPS timestamp of the GPS location fix would not prevent the cellular signal from being correlated with the GPS location fix as "contemporaneous" location and cellular signal data.

In some implementations, if a mobile device has an onboard accelerometer in the baseband subsystem, the mobile device can determine the current speed and direction of movement of a mobile device using the baseband accelerometer. The baseband location monitoring module of the mobile device can then calculate a current location of the mobile device when a cell signal is received, based on a previous GPS location fix, the speed and direction of the movement of the mobile device, and a time difference between the GPS timestamp of the previous GPS location fix and the receipt timestamp of the cell signal. The newly calculated current location can then be correlated with the received cell signal as "contemporaneous" location and cellular signal data.

As shown in FIG. 3, the sever 310 can receive correlated location and cellular signal information from multiple mobile devices over time, where the multiple devices receive cellular signals from transmitters of different base stations and possibly at different locations and times. In addition, when each mobile device moves from one location to another location, the mobile device can provide correlated location and cellular signal information related to transmitters of different base stations, or the same transmitter of the same base station at different times. These correlated location and cellular signal data can be utilized by the server 310 to build profiles for the cellular network base stations that used the transmitters to broadcast to the multiple mobile devices.

In some implementations, the location server 310 can collect data from mobile devices that are subscribers of different cellular networks and/or carriers. Therefore, the server 310 can build a comprehensive database of cellular base stations that cover the base stations of multiple network carriers. Furthermore, users of mobile devices can be found at many locations within a cell sector of a base station. Therefore, signals transmitted from the base station can be sampled at many locations within the cell sector, for example, especially in densely populated or high traffic areas, without any specialized equipment to scan the entire area of the cell sector one by one. Based on the high sample rate of cellular signal data in the cell sector, more detailed information about the cell signals received at various locations in the cell sector can be collected, where information of such detail is not practical to obtain using conventional specialized equipment, for example, by scanning all the sample locations within the cell sector one by one using a special vehicle.

In addition to the breadth and density of the data collection, the "crowd sourced" data collected from the baseband subsystems of the mobile devices are also more up to date, such that the profiles of the base stations at the server 310 can stay up to date. For example, as new base stations or transmitters are added, the signal data for the new base station can be quickly discovered among the data received from the mobile devices, and a profile can be quickly built for the new base station. When an existing base station is upgraded, moved, or extended by one or more boosters, or as the clock at the existing base station drifts over time, these changes related to the base station can quickly be reflected in the data received from the mobile devices as well. The location, signal strength, clock error, and other characteristic parameters of the existing base station can be then updated according to the most recent sets of location and cellular signal data received from the mobile devices that registered signals from the base station's transmitters.

In some implementations, when the profile building module 318 discovers that the clock error for a particular base station is more than a predetermined threshold value, the server 310 can generate an alert to the network carrier of the base station to initialize a synchronization event to reset the clock at the base station.

In some implementations, the profile building module 318 of the server 310 can build a signal strength map based on the correlated location and cellular signal data. Each set of correlated location and cellular signal information can include a location and a signal strength value for the cellular signal received by a mobile device at the location. The signal strength values in the data received from multiple mobile devices for each location within a cell sector of a base station can be averaged to remove variations due to the different sensitivities of the mobile devices. A signal strength map can then be created for each cell sector of a base station based on the average signal strengths at the different locations within the cell sector of the base station. In some implementations, the server 310 can identify areas with weak signal strength or "holes" with no receptions due to the surrounding terrains and artificial interferences, and notify the network carrier of these areas needing improved cellular coverage.

In some implementations, the server 310 can build a base station almanac 320 based on the profiles of cellular base stations derived from the "crowd sourced" correlated location and cellular signal data collected from the baseband subsystems of the a large number of widely distributed mobile devices. In some implementations, the base station almanac 320 can be a listing of cellular base stations, stored in association with a respective set of parameters characterizing the base station. The set of parameters can include the identifier of the network carrier that operates the base station, the number of transmitters and/or boosters utilized by the base station, the location of the base station, the clock error of the base station relative to a reference time (e.g., GPS time), the total coverage range of the base station, the cell IDs of the base stations' cell sectors, the maximum signal strength of the base station, for example. The base station almanac 320 can include a signal strength map for each base station and/or cell sector of the base station and a listing of the base station's neighboring base stations, for example.

In some implementations, the base station almanac 310 can be built gradually as data related to signals associated with each base station is collected from mobile devices that received the signals from the base station over time. For example, each time the location server 310 receives a set of correlated location and cellular signal data from a baseband subsystem of a mobile device, the location server 310 can verify if the cell ID specified in the correlated data corresponds to an entry in the base station almanac 320. If no entry of a base station associated with the cell ID is found in the base station almanac 310, a new entry can be created for the base station associated with the cell ID in the correlated data. Initial estimates for the various characteristics for the base station can be derived based on the correlated data. Alternatively, the server 310 can store the set of correlated data for a period of time such that more sets of correlated data related to this base station are received from other mobile devices or from the same mobile device at other locations. The estimates for the various characteristics of the base station can be an average of the estimates computed based on the multiple sets of correlated data stored for the base station. In some implementations, the older sets of correlated data can be phased out gradually, e.g., by a weighting factor that attributes decreasing weight to the sets of correlated data in calculating the estimates as the sets of correlated data gets older.

In some implementations, information obtained from other sources, e.g., information obtained from the cellular network carriers, can be used to supplement and/or verify the information derived from correlated location-signal data received from the baseband subsystems of the mobile devices, and vice versa.

In some implementations, when the server 310 has established a substantially complete base station almanac 320, the server 316 can utilize the base station almanac to provide cellular-based positioning services to mobile devices.

As shown in FIG. 3, the server 310 can include a positioning service module 322 that receives positioning requests from mobile devices (e.g., mobile device 308), and provide position fixes based on the information in the base station almanac 320 and the information about the cellular signals received by the mobile device. In some implementations, the position fixes can be derived by the positioning service module 322 using the cell signal information received from the mobile device and the base station profiles in the base station almanac 320, and provided back to the requesting mobile devices (e.g., the mobile device 308).

Alternatively, after a mobile device sends a positioning request to the server 310, the positioning service module 322 can provide information (e.g., locations and clock errors)

about the nearby base stations to the requesting mobile device, and the position fix can be derived by the mobile device itself using the information about the cellular signals received from the nearby base stations and the information about the nearby base stations received from the server.

In some implementations, whether the positioning fix is to be derived by the requesting mobile device (e.g., the mobile device 308) or by the positioning service module 322 can depend on whether the application subsystem is currently active on the requesting mobile device. In either case, the mobile device sends a positioning request that identifies the nearby base stations (e.g., the base station 312 and 314) from which the mobile device is currently receiving cellular signals. For example, the positioning request can include the cell IDs of the signals that are currently received by the mobile device.

In some implementations, if the application subsystem is not currently active on the mobile device (e.g., the mobile device 308), the mobile device can send the positioning request to the server 310 using its baseband subsystem, and receive the cellular-based position fix from the positioning service module 322. If the application subsystem is currently active in the mobile device, the mobile device can send the positioning request to the server 310 using either the application subsystem or the baseband subsystem, and the positioning service module 322 can send the profile information of the nearby base stations to the mobile device. The positioning fix can be derived by the application subsystem based on the profile information of the nearby base stations and the information about the cellular signals received from the nearby base stations by the mobile device.

In some implementations, a preference parameter can be included in the positioning request send from the mobile device, where the preference parameter can indicate whether the request is sent from the baseband subsystem or the application subsystem, and the server 310 can decide whether to send profile information of the nearby base stations of the mobile device or the cellular-base position fix to the mobile device. Alternatively, the preference parameter can indicate whether the mobile device would like to receive the base station profile information or the cellular-based position fixe, and the server will respond to the positioning request in accordance with the preference parameter in the positioning request.

In some implementations, the location server 310 can also provide (e.g., via the positioning service module 322) bundles of base station profile information to mobile devices (e.g., mobile device 308). For example, when a mobile device sends in a positioning request to the server, the mobile device can further indicate to the server 310 that the mobile device has capability to store base station information bundles, and to subsequently use the base station information (e.g., base station location and clock error information) in the information bundles to perform cellular-based self-positioning, or cellular-assisted self-positioning without further assistance from the server 310 or other network carriers. In response to such a request, the server can prepare the information bundle and transmit it to the mobile device. The mobile device can store the information bundle in a location (e.g., a flash memory or other data storage media accessible by the baseband subsystem and/or the application subsystem of the mobile device). The mobile device can subsequently refer to the stored information bundle to identify the base stations from which it is currently receiving cellular signals using the cell IDs of the signals. The mobile device can use the base station location data and clock error data in the stored base station information bundle to perform cellular-based self-positioning, or cellular-assisted GPS positioning, without contacting the server or the network carrier to specifically request the base station information again.

FIG. 4 is a block diagram illustrating an example of how multiple sets of correlated location and cellular signal information collected from one or more mobile devices (e.g., mobile devices 302, 304, and 306) are used to derive an estimated location and an estimated clock error for a transmitter of a base station (e.g., base station 312).

As shown in FIG. 4, three sets of correlated location and cellular signal information have been received by the profile building module of the server. The three sets of correlated location and cellular signal information can be received from three different mobile devices located at three different locations (e.g., loc_1, loc_2, and loc_3) at times (e.g., t1, t2, and t3, respectively), or from the same mobile devices located at three different locations at different times (e.g., t1, t2, and t3, respectively).

Each set of correlated location and cellular signal data includes at least a receipt timestamp of a respective cellular signal, and a location (e.g., a GPS location fix) of the mobile device when the cell signal was received. When the clock of the mobile device is synchronized to GPS time, the receipt timestamp can be considered to be the real time that the signal is received by the mobile device. However, the transmission timestamp of the cellular signal includes a clock error of the base station relative to the real time at which the signal departed from the transmitter of the base station. The difference between the receipt timestamp and the transmission timestamp (i.e., the recorded travel time) is equal to the real travel time of the signal from the transmitter of the base station to the mobile device minus the clock error (e.g., $\Delta T$) of the base station 312. An estimated distance (e.g., "~D1") between the transmitter of the base station 312 and the mobile device (e.g., the mobile device 302) can be calculated by multiplying the recorded travel time (e.g., "rcpt_t1−st_t1") by a known average speed (e.g., "v") of radio wave in air. The estimated distance (e.g., "~D1") calculated in this manner is equal to the real distance (e.g., "D1") between the mobile device (e.g., the mobile device 302) and the transmitter of the base station 312 minus a distance error (e.g., "$\Delta d1$") which is the product of the average speed (e.g., "v") of the radio wave and the clock error (e.g., $\Delta \cdot T$) at the base station.

In other words, ~D1=v*(rcpt_t1−st_t1); and ~D1=D1−v*$\Delta T$, in which, D1 and $\Delta T$ are unknown. Similarly, for the mobile device 304, ~D2=v*(rcpt_t2−st_t2); and ~D2=D2−v*$\Delta T$, in which, D2 and $\Delta T$ are unknown. For the mobile device 306, ~D3=v*(rcpt_t3−st_t3); and ~D3=D3−v*$\Delta T$, in which, D3 and $\Delta T$ are unknown. The distance error "v*$\Delta T$" is indicated as "$\Delta d$" in FIG. 3.

As shown in FIG. 4, based on the respective estimated distances (e.g., ~D1, ~D2, ~D3) between the base station and each pair of two mobile devices (e.g., mobile devices 302 and 304, mobile devices 302 and 306, and mobile devices 304 and 306), triangulation can be performed to determine an estimated location (e.g., location 312', location 312", and location 312'", respectively) for the transmitter of the base station 312.

As shown in FIG. 4, based on triangulation, the estimated locations 312', 312", and 312'" of the base station 312 are distributed in a small area. The estimated location 312' is determined based on the locations of mobile devices 302 and 304 at locations "loc_1" and "loc_2," and is at the intersection between the arc with a radius "D1-$\Delta d$" and centered at "loc_1" and the arc with a radius "D2-$\Delta d$" and centered at "loc_2." The estimated location 312" is determined based on the locations of mobile devices 302 and 306 at "loc_1" and "loc_3," and is at the intersection between the arc with a radius "D2-Δd" and centered at "loc_1" and the arc with a radius "D3-Δd" and centered at "locΔ_3." The estimated location 312" is determined based on the locations of the mobile devices 304 and 306 at "loc_2" and "loc_3," and is at the intersection between the arc with a radius D2-Δd and centered at "loc_2" and the arc with a radius D3-Δd and centered at "loc_3." The estimated location (e.g., "~BS_LOC") of the base station 312 can be an average of the locations 312', 312", and 312'". As more sets of correlated location and cellular signal data are obtained for the base station 312, more estimated locations of the base station can be obtained, and the average of all the estimated locations can better approximate the real location of the base station 312. The estimated location "~BS_LOC" can be entered in the profile of the base station 312. The accuracy of the estimated location "~BS_LOC" can be improved over time as more data are received from mobile devices.

In addition to the estimated location of the base station 312, the estimated clock error ΔT can also be obtained. For example, in the relationship ~D1=D1−v*ΔT, D1 and ΔT are unknown. According to this relationship, ΔT=(D1−~D1)/v. An estimated clock error ~ΔT1 can be calculated by replacing the real distance D1 between the base station 312 and the mobile device 302 located at "loc_1" with a distance (~D1') between the estimated location "BS_LOC" of the base station 312 and the location "loc_1," in the above relationship. The distance ~D1' is a better estimate for the real distance between the base station 312 and the mobile device 302 than ~D1. Thus, an estimated clock error "−ΔT1" is equal to "(~D1'−~D1')/v." Similarly, other estimates of the clock error at the base station 312 can be obtained using the data related to the other mobile devices 304 and 306. Based on the data related to the mobile device 304, the estimated clock error is "~ΔT2=(~D2'−~D2)/v," where ~D2' is the distance between locations "BS_LOC" and "loc_2." Based on the data related to the mobile device 306, the estimated clock error is "~ΔT3=(~D3'−~D3)/v," where −D3' is the distance between locations "BS_LOC" and "loc_3." A better estimate of the clock error ("~ΔT") for the base station 312 can be an average of "~ΔT1," "~ΔT2," and "~ΔT3." The accuracy of the clock error estimate ("~ΔT") also improves as more data is collected from more mobile devices.

FIG. 4 is merely an illustrative example of how the "crowd-sourced" correlated location and cellular signal data can be utilized in deriving information about a base station. Other methods of deriving useful information about the base stations from the "crowd sourced" correlated location and cellular signal data are possible.

Exemplary Processes for Baseband Location Monitoring and Related Functions

Figure 5:
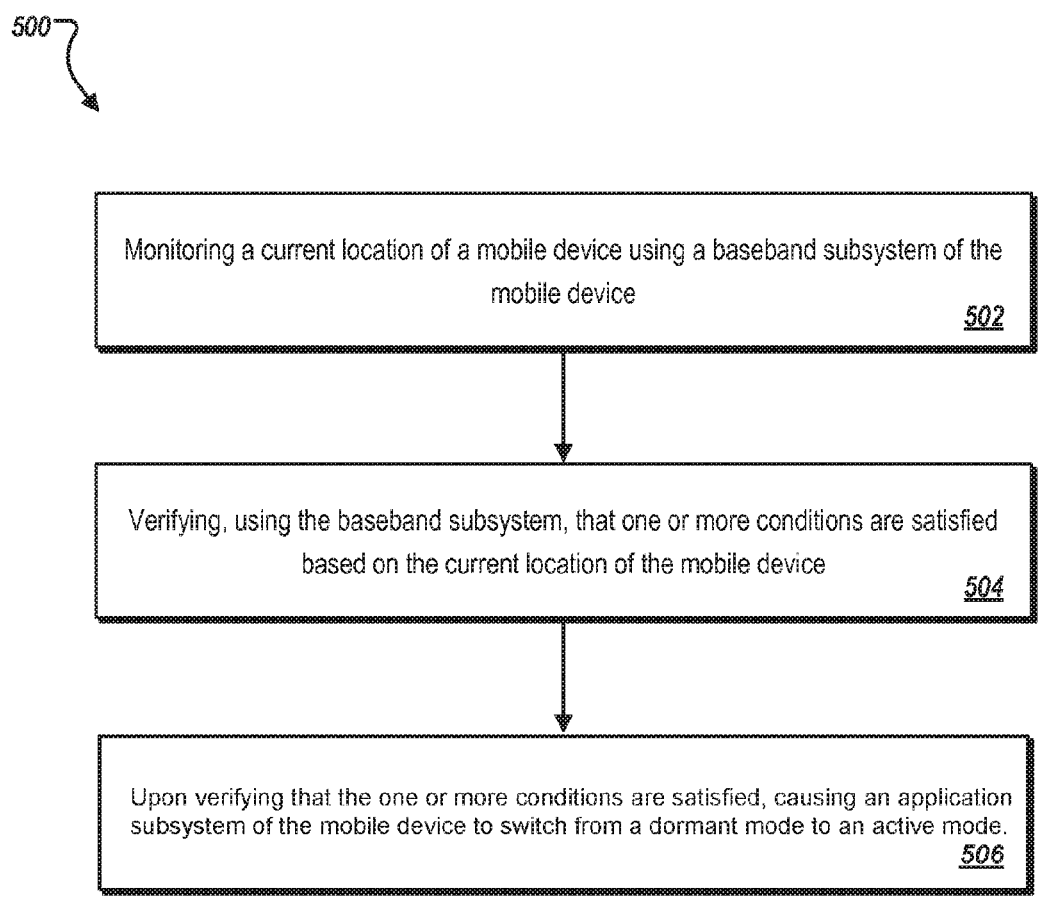
FIG. 5 is a flow diagram of an example process for monitoring a current location of a mobile device using a baseband subsystem of the mobile device and invoking an application subsystem of the mobile device according to location-based decision logic implemented in the baseband subsystem.

FIG. 5 is a flow diagram of an example process 500 for monitoring a current location of a mobile device using a baseband subsystem of the mobile device and invoking an application subsystem of the mobile device according to location-based decision logic implemented in the baseband subsystem. The example process 500 can be performed by a mobile device (e.g., the example mobile device 100). In the example process 500, the mobile device monitors a current location of the mobile device using a baseband subsystem of the mobile device (500). The mobile device then verifies, using the baseband subsystem, that one or more conditions are satisfied based on the current location of the mobile device (504). Upon verifying that the one or more conditions are satisfied, the mobile device can cause an application subsystem of the mobile device to switch from a dormant mode to an active mode (506).

In some implementations, the one or more conditions includes that two consecutive position fixes resulted from the monitoring indicate a crossing of a geofence by the mobile device.

In some implementations, the baseband subsystem of the mobile device causes the application subsystem of the mobile device to switch from the dormant mode to the active mode.

In some implementations, after the application subsystem of the mobile device switches from the dormant mode to the active mode, an application program in the application subsystem of the mobile device can be invoked (e.g., by the baseband subsystem of the mobile device), where the application program utilizes the current location of the mobile device as an input.

In some implementations, after the application subsystem of the mobile switches from the dormant mode to the active mode, execution of an application program in the application subsystem of the mobile device is resumed, where the application program utilizes the current location of the mobile device as an input.

Figure 6:
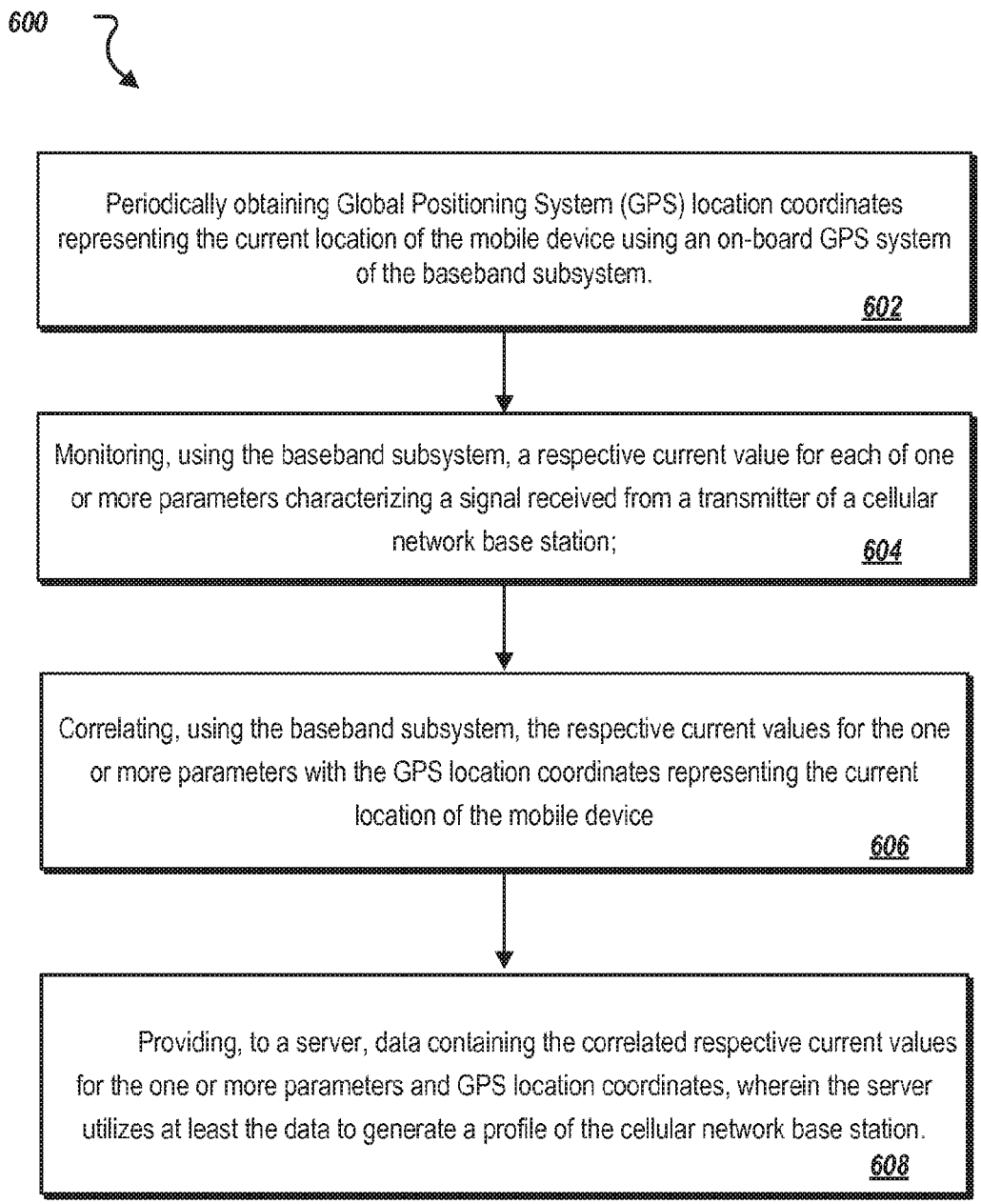
FIG. 6 is a flow diagram of an example process for correlating GPS location fixes and cellular signal information obtained through baseband self-monitoring and providing the correlated location and cellular signal information to a server.

FIG. 6 is a flow diagram of an example process 600 for correlating GPS location fixes and cellular signal information obtained through baseband self-monitoring and providing the correlated location and cellular signal information to a server.

The example process 600 can be performed by a mobile device, such as the example mobile device 100. In some implementations, monitoring the current location of the mobile device using the baseband subsystem involves using a baseband GPS subsystem.

In the example process 600, GPS location coordinates representing the current location of a mobile device is periodically obtained using an on-board GPS system of the baseband subsystem (602).

In the implementations where location monitoring is based on GPS signals, to verifying that the one or more conditions are satisfied based on the current location includes determining, using the baseband subsystem, that two set of consecutively obtained GPS location coordinates indicate a crossing of a geofence associated with the mobile device by the mobile device.

Further in the example process 600, the mobile device, using its baseband subsystem, monitors a respective current value for each of one or more parameters characterizing a signal received from a transmitter of a cellular network base station (604). The mobile device further uses its baseband subsystem to correlate the respective current values for the one or more parameters with the GPS location coordinates representing the current location of the mobile device (606). The mobile device then provides, to a server, data containing the correlated respective current values for the one or more parameters and GPS location coordinates, wherein the server utilizes at least the data to generate a profile of the cellular network base station.

In some implementations, the mobile device can provide the data using the application subsystem after storing the correlated data for a period of time until more correlated data is obtained. In some implementations, the mobile device can provide the data using the baseband subsystem immediately after the correlation is completed.

Figure 7:
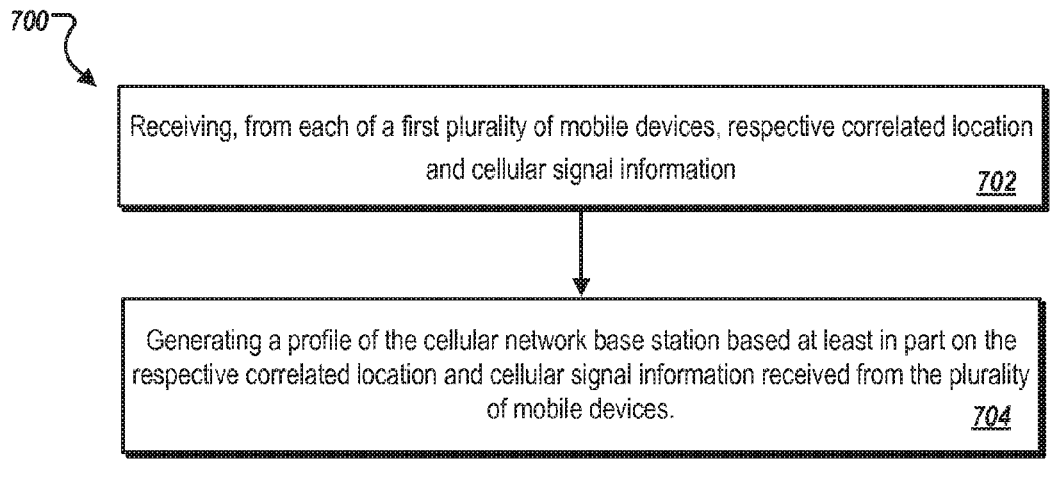
FIG. 7 is a flow diagram of an example process for collecting correlated location and cellular signal information from baseband subsystems of multiple mobile devices, and using such correlated location and cellular signal information to build a profile of a cellular network base station.

FIG. 7 is a flow diagram of an example process 700 for collecting correlated location and cellular signal information from baseband subsystems of multiple mobile devices, and using such correlated location and cellular signal information to build a profile of a cellular network base station.

The example process 700 can be performed by a server (e.g., server 310 in FIG. 3) in communication with the multiple mobile devices. In the example process 700, the server receives, from each of a plurality of mobile devices, respective correlated location and cellular signal information (702). The respective correlated location and cellular signal information contains respective values of one or more parameters characterizing a respective signal received by the mobile device from a transmitter of a cellular network base station, and a GPS location fix representing a location at which the respective signal was received by the mobile device. As described earlier in the specification, the GPS location fix and the signal were obtained using the baseband subsystem of the mobile device.

The server can generate a profile of the cellular network base station based at least in part on the respective correlated location and cellular signal information received from the plurality of mobile devices (704). In some implementations, the one or more parameters characterizing the respective signal received from the transmitter of the cellular network base station include on one or more of an identifier for a provider of the cellular network base station, a cell ID for the transmitter of the cellular network base station, a transmission timestamp of the signal, a receipt timestamp of the signal, a strength of the signal, a phase of the signal, and an angle of arrival of the signal.

In some implementations, the profile of the cellular network base station includes a respective estimate for each of one or more profile parameters including a clock error, a base station location, a coverage area, and a maximum signal strength associated with the cellular network base station.

Figure 8:
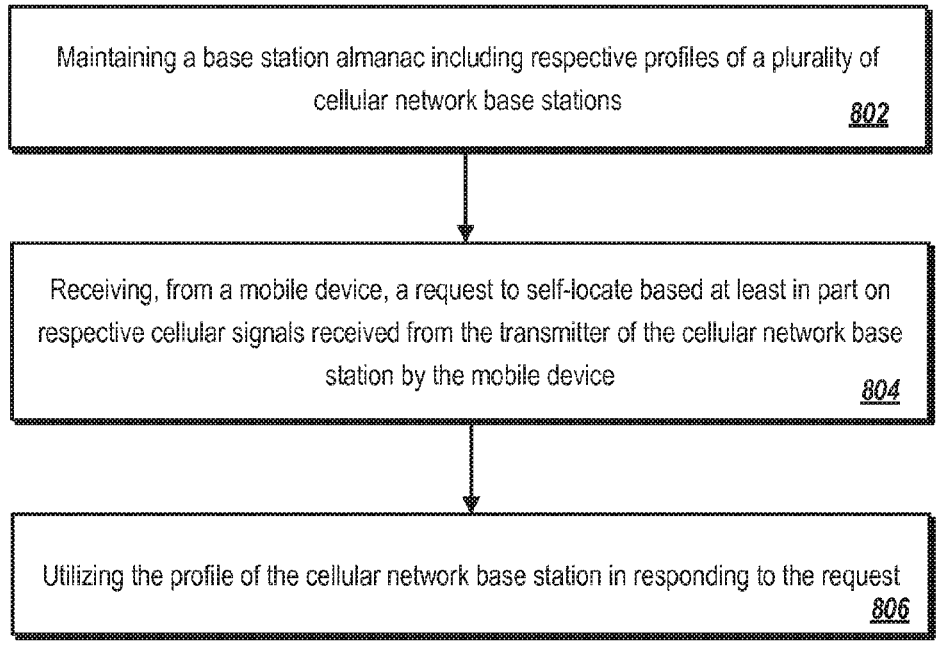
FIG. 8 is a flow diagram of an example process for utilizing "crowd sourced" correlated location and cellular signal information to maintain a base station almanac and providing cell-based positioning services to mobile devices using the base station almanac.

FIG. 8 is a flow diagram of an example process 800 for utilizing "crowd sourced" correlated location and cellular signal information to maintain a base station almanac and providing cell-based positioning services to mobile devices using the base station almanac. The example process 800 can be performed by a server such as the server 310 shown in FIG. 3.

In the example process 800, the server maintains a base station almanac including respective profiles of a plurality of cellular network base stations (802). Each respective profile is generated and updated based at least in part on respective correlated location and cellular signal information received from respective baseband subsystems of a respective plurality of mobile devices.

In the example process 800, the server receives, from a mobile device, a request to self-locate based at least in part on respective cellular signals received from the transmitter of the cellular network base station by the mobile device (802). The server then utilizes the profile of the cellular network base station in responding to the request (804).

The example processes shown above are merely illustrative. Other details of these processes and other related processes are described in other parts of the specification (e.g., with respect to FIGS. 1-4).

Exemplary Mobile Device Architecture

Figure 9:
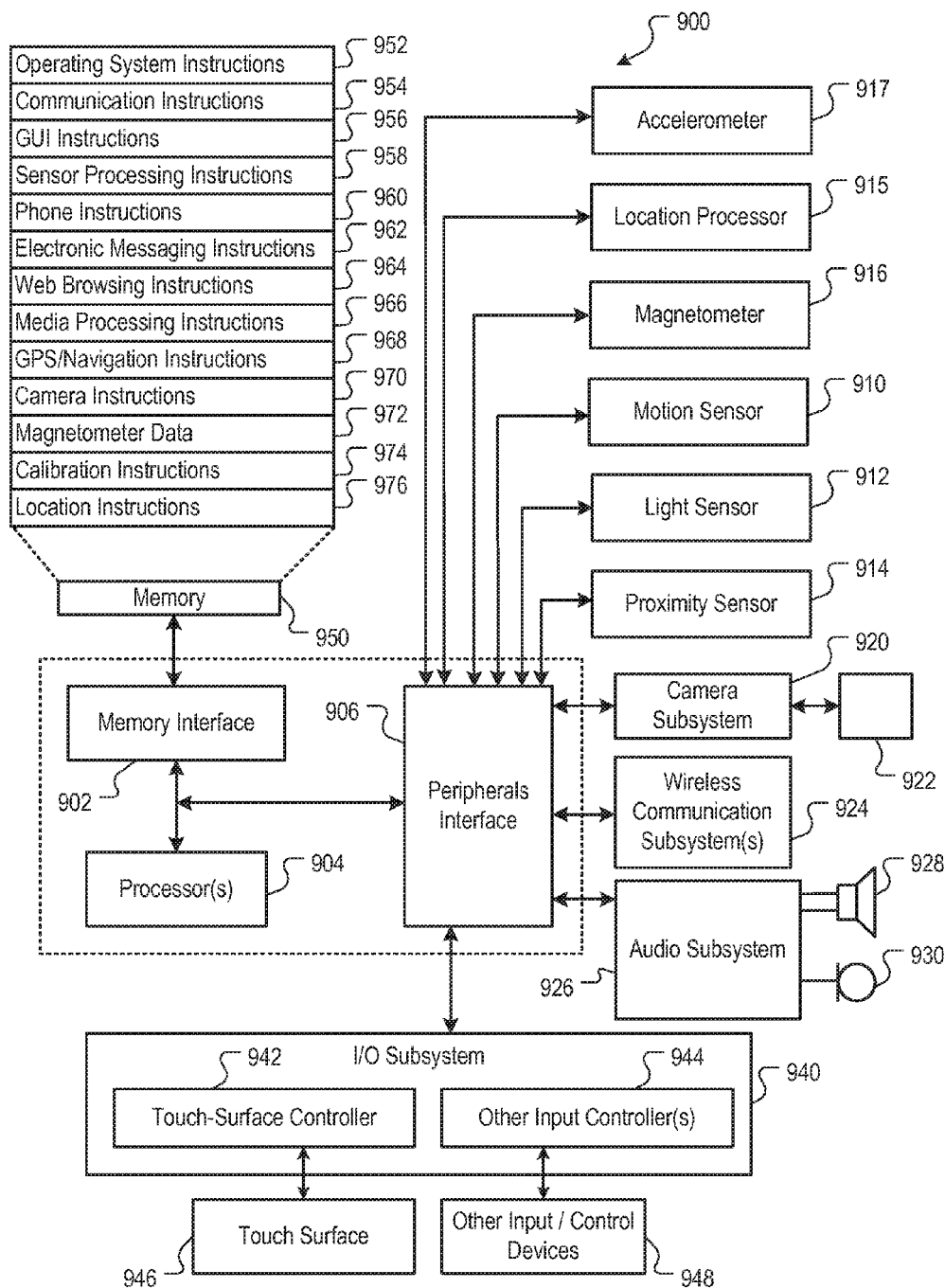
FIG. 9 is a block diagram illustrating an example device architecture of a mobile device implementing the features and operations described in reference to FIGS. 1-8.

FIG. 9 is a block diagram of exemplary architecture 900 for the mobile devices of FIGS. 1-8. A mobile device can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include one or more application processors (APs) and one or more baseband processors (BPs). The application processors and baseband processors can be integrated in one single process chip. The various components in mobile device 100, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch surface controller 942 and/or other input controller(s) 944. Touch-surface controller 942 can be coupled to a touch surface 946 (e.g., a touch screen or touch pad). Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946; and a pressing of the button for a second duration that is longer than the first duration may turn power to mobile device 100 on or off. The user may be able to customize a functionality of one or more of the buttons. The touch surface 946 can, for example, also be used to implement virtual or soft buttons and/or a keyboard, such as a soft keyboard on a touch-sensitive display.

In some implementations, mobile device 100 can present recorded audio and/or video files, such as MP3, AAC, and MPEG files. In some implementations, mobile device 100 can include the functionality of an MP3 player, such as an iPod™. Mobile device 100 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate Global Navigation Satellite System (GNSS) (e.g., GPS) and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can include location instructions 976 that can include location functions, location monitoring programs, and other related functions described with respect to FIGS. 1-8.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
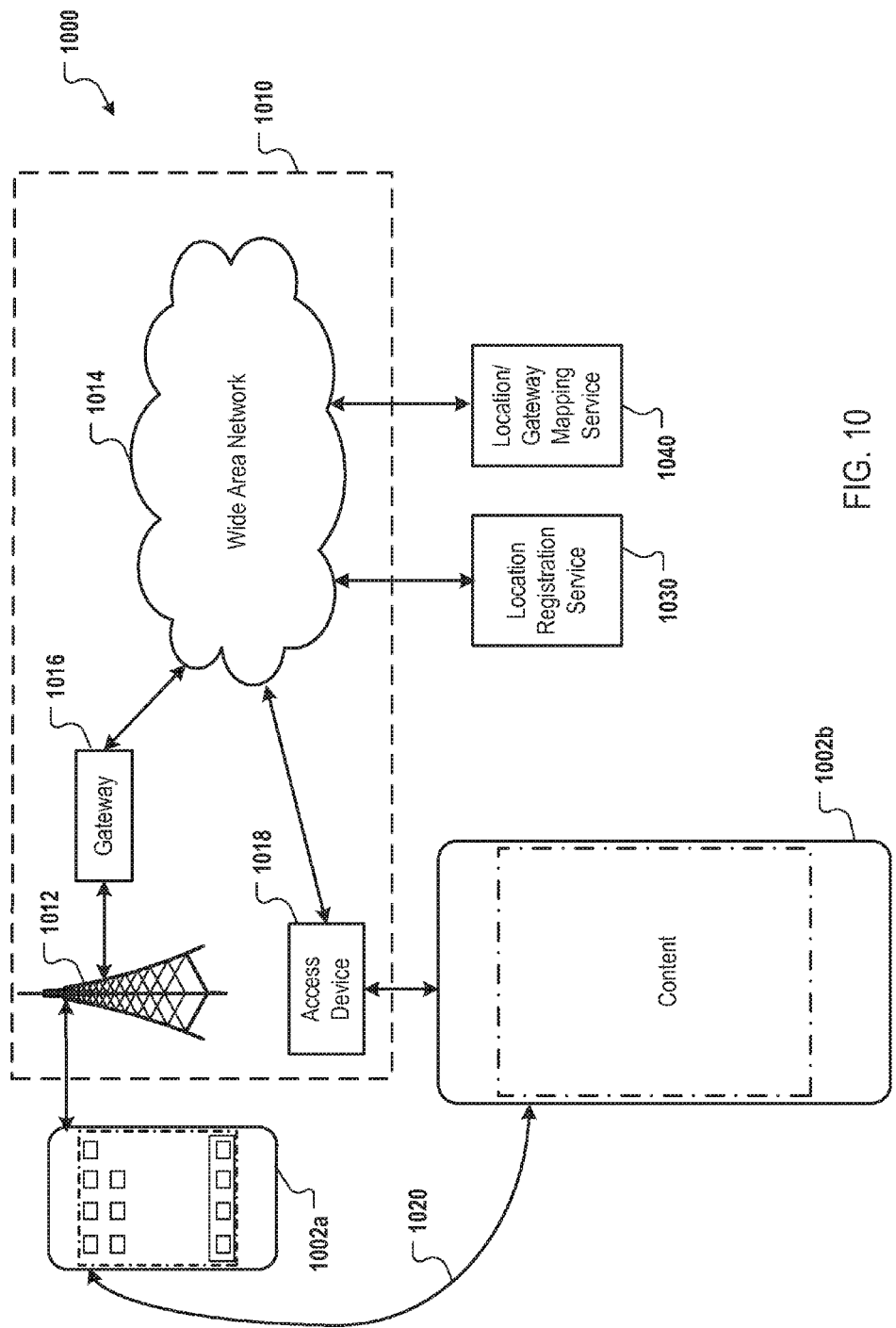
FIG. 10 is a block diagram of an exemplary network operating environment for the mobile devices of FIGS. 1-9.

FIG. 10 is a block diagram of exemplary network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices 1002a or 1002b, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more location registration services 1030 can be used to associate application programs with geographic regions. The application programs that have been associated with one or more geographic regions can be provided for download to mobile devices 1002a and 1002b.

Location-gateway mapping service 1040 can determine one or more identifiers of wireless access gateways associated with a particular geographic region, and provide the one or more identifiers to mobile devices 1002a and 1002b for registration in association with a baseband subsystem.

Mobile device 1002a or 1002b can also access other data and content over the one or more wired and/or wireless networks. For example, content publishers, such as news sites, Rally Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, cells are represented as hexagons in the figures. The actual shape of a cell can vary.

What is claimed is:

1. A computer-implemented method, comprising:
by a server:
receiving, from Global Positioning System (GPS) enabled mobile devices, correlated location and cellular signal information, the correlated location and cellular signal information including i) values of one or more parameters characterizing signals received from cellular network base stations, and ii) GPS location fixes representing locations of the GPS enabled mobile devices;
generating profiles of the cellular network base stations based at least in part on the correlated location and cellular signal information;
receiving a location request from a particular mobile device; and
providing one or more of the profiles to the particular mobile device in response to the location request, the one or more profiles characterizing cellular network base stations within a predetermined geographic area that encompasses a current location of the mobile device.

2. The computer-implemented method of claim 1, wherein the one or more profiles further characterize a predicted location of the particular mobile device different from the current location, the predicted location being within a predetermined radius of the current location of the particular mobile device and within the predetermined geographic area.

3. The computer-implemented method of claim 1, wherein the particular mobile device includes a mobile device having a deactivated GPS location module, or a mobile device that does not include GPS location capabilities.

4. The computer-implemented method of claim 1, wherein the values of the one or more parameters characterizing the signals received from a cellular network base station of the cellular network base stations includes one or more of: an identifier for a provider of the cellular network base station, a cell identifier (ID) for the cellular network base stations, a transmission timestamp of a signal received from the cellular network base station, a receipt timestamp for the signal received from the cellular network base station, a signal strength, a signal phase, or an angle of arrival for the signal received from the cellular network base station.

5. The computer-implemented method of claim 1, wherein generating profiles of the cellular network base stations comprises maintaining a base station almanac that includes the profiles of cellular network base stations, where each profile is generated and updated based at least in part on the correlated location and cellular signal information received from a mobile device of the GPS enabled mobile devices.

6. The computer-implemented method of claim 1, wherein the particular mobile device is a mobile device other than the GPS enabled mobile devices.

7. The computer-implemented method of claim 1, wherein the particular mobile device is one of the GPS enabled mobile devices.

8. The computer-implemented method of claim 1, wherein the profiles comprise information usable by the particular mobile device to perform a cellular-based positioning function without contacting the server.

\* \* \* \* \*